United States Patent
Park

(10) Patent No.: US 10,762,001 B2
(45) Date of Patent: Sep. 1, 2020

(54) MEMORY SYSTEM AND OPERATION METHOD THEREOF

(71) Applicant: Sk hynix Inc., Gyeonggi-do (KR)

(72) Inventor: JongJu Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/054,495

(22) Filed: Aug. 3, 2018

(65) Prior Publication Data

US 2019/0108136 A1    Apr. 11, 2019

(30) Foreign Application Priority Data

Oct. 11, 2017    (KR) .................... 10-2017-0129847

(51) Int. Cl.
| | |
|---|---|
| *G06F 12/121* | (2016.01) |
| *G06F 12/0871* | (2016.01) |
| *G06F 12/02* | (2006.01) |
| *G06F 12/0873* | (2016.01) |
| *G06F 12/126* | (2016.01) |

(52) U.S. Cl.
CPC ........ *G06F 12/121* (2013.01); *G06F 12/0246* (2013.01); *G06F 12/0871* (2013.01); *G06F 12/0873* (2013.01); *G06F 12/126* (2013.01); *G06F 2212/7201* (2013.01)

(58) Field of Classification Search
CPC .................................................. G06F 12/0246
See application file for complete search history.

(56) References Cited

U.S. PATENT DOCUMENTS

| | | | | |
|---|---|---|---|---|
| 2013/0080732 | A1* | 3/2013 | Nellans ............... | G06F 12/0246 711/206 |
| 2013/0198439 | A1* | 8/2013 | Kurotsuchi ......... | G06F 12/0246 711/103 |
| 2016/0055087 | A1 | 2/2016 | Chaudhary et al. | |
| 2018/0088863 | A1* | 3/2018 | Lee ....................... | G06F 3/0608 |
| 2018/0336150 | A1* | 11/2018 | Jinn ...................... | H04W 28/08 |

FOREIGN PATENT DOCUMENTS

KR    1020160032934    3/2016

* cited by examiner

*Primary Examiner* — Edward J Dudek, Jr.
(74) *Attorney, Agent, or Firm* — IP & T Group LLP

(57) ABSTRACT

A memory system includes a nonvolatile memory device including a plurality of memory blocks; and a controller including a command queue adapted to store a plurality of commands from the host, wherein the controller is suitable for managing mapping information for mapping logical addresses of the commands to physical addresses of the nonvolatile memory device, storing partial mapping information into an internal cache memory, storing the whole mapping information into the memory blocks, selecting a piece of victim mapping information among the partial mapping information stored in the internal cache memory, and removing the piece of victim mapping information based on logical addresses of the commands stored in the command queue.

18 Claims, 15 Drawing Sheets

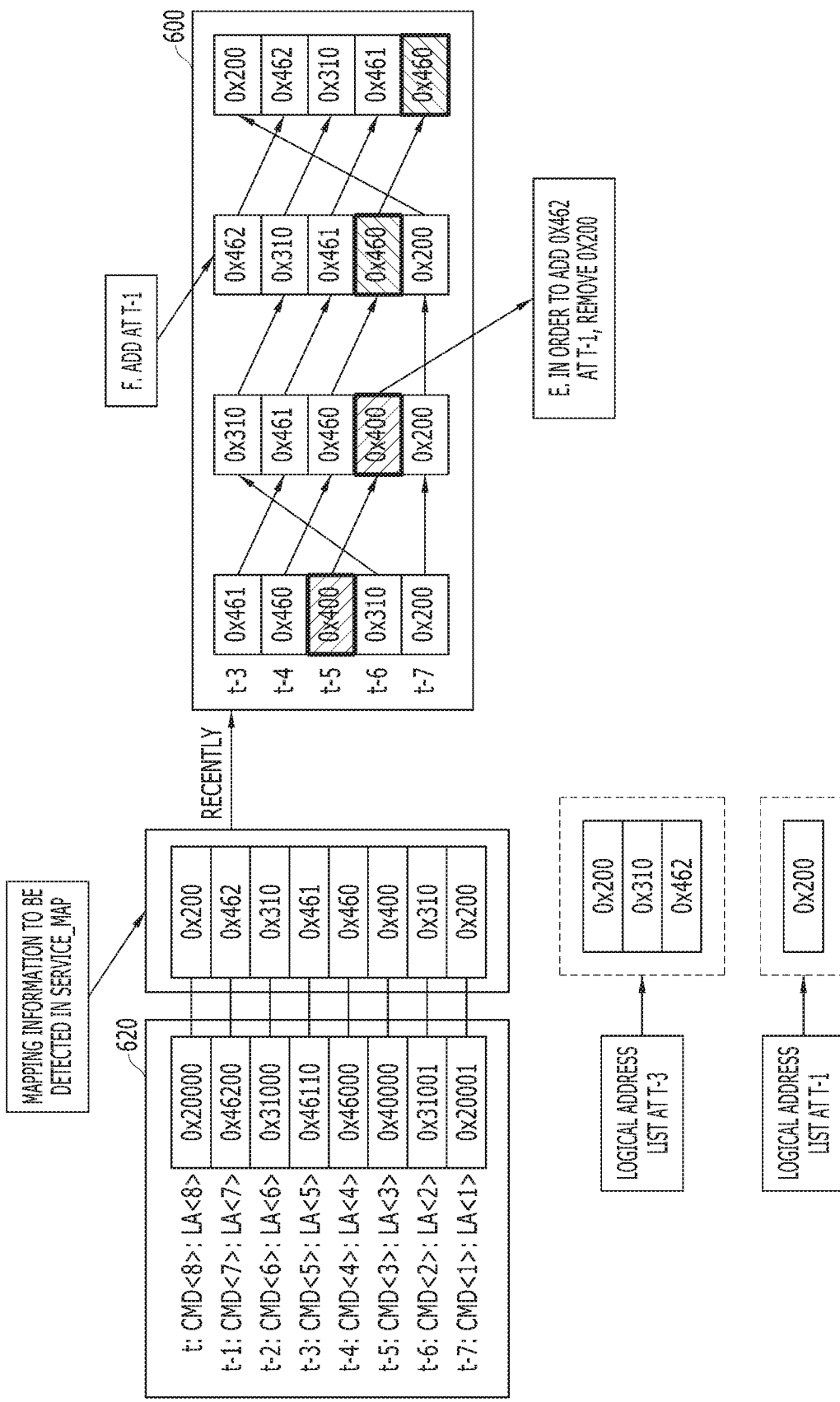

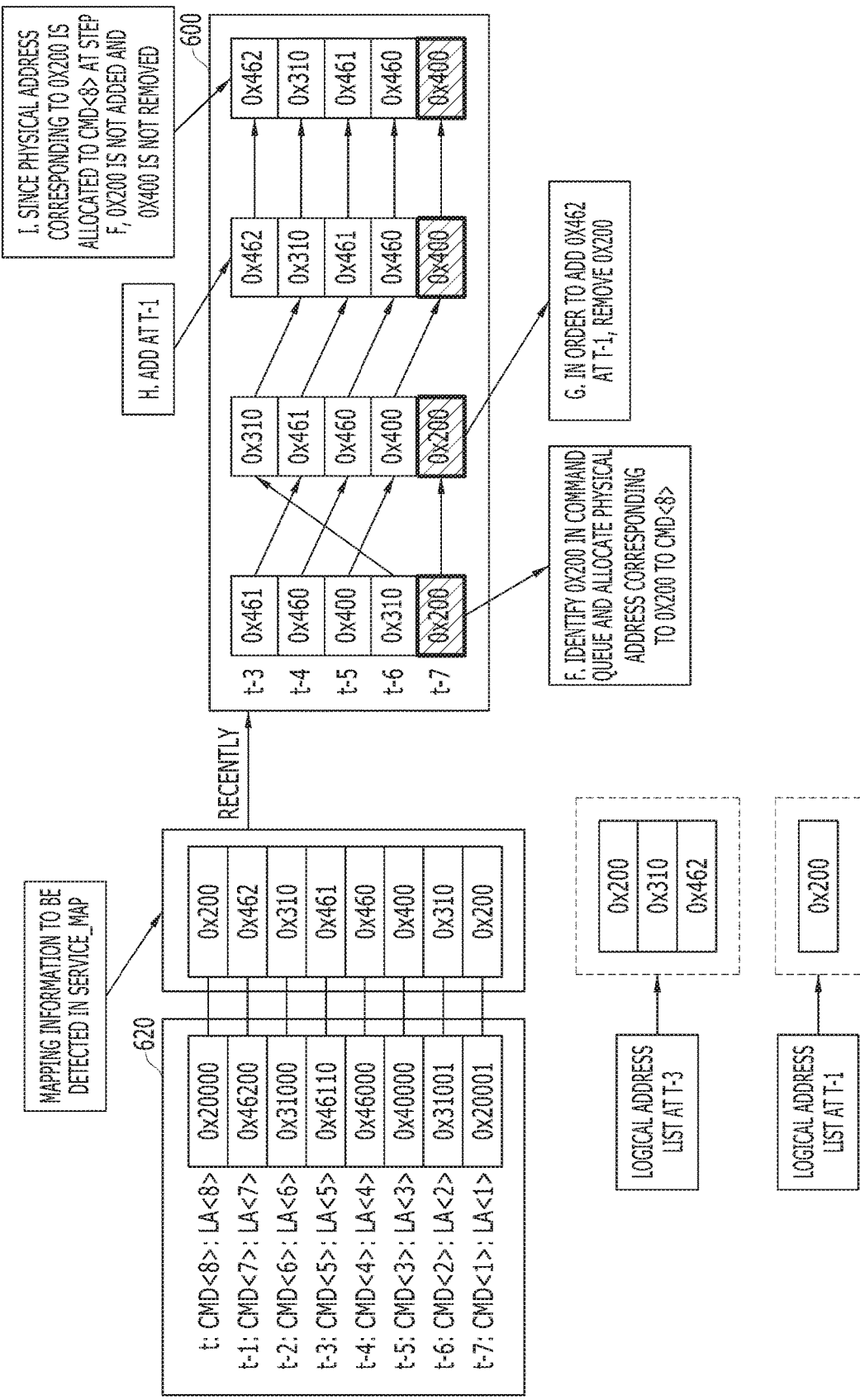

MEMORY SYSTEM AND OPERATION METHOD THEREOF

CROSS-REFERENCE TO RELATED APPLICATIONS

The present application claims priority under 35 U.S.C. § 119(a) to Korean Patent Application No. 10-2017-0129847 filed on Oct. 11, 2017, the disclosure of which is incorporated herein by reference in its entirety.

BACKGROUND

1. Field

Various exemplary embodiments of the present invention relate generally to a memory system. More particularly, exemplary embodiments relate to a memory system capable of efficiently managing mapping information in a cache memory, and an operating method thereof.

2. Description of the Related Art

The paradigm for computing environments moves toward ubiquitous computing which allows people or users to access their computing systems or commonly supplied computing systems anytime anywhere. In this era of ubiquitous computing, demand for portable electronic devices, such as mobile phones, digital cameras and laptop computers are soaring. Those electronic devices generally include a memory system using a memory device as a data storage device. The data storage device may be used as a main memory unit or an auxiliary memory unit of a portable electronic device.

Since the data storage device is using a memory device which does not have a mechanical driving unit (e.g., a mechanical arm with a read/write head) as compared with a hard disk device, it may have excellent stability and durability. Also, the data storage device can have faster data access rate and lower power consumption than a hard disk device. Non-limiting examples of data storage devices having such advantages include Universal Serial Bus (USB) memory devices, memory cards of diverse interfaces, Solid-State Drives (SSD) and/or the like.

SUMMARY

Various embodiments of the disclosure of the present invention are directed to an improved memory system capable of managing more efficiently mapping information in a cache memory than heretofore memory systems.

In accordance with an embodiment of the present invention, a memory system may include: a nonvolatile memory device including a plurality of memory blocks; and a controller including a command queue adapted to store a plurality of commands from the host, wherein the controller is suitable for managing mapping information for mapping logical addresses of the commands to physical addresses of the nonvolatile memory device, storing partial mapping information into an internal cache memory, storing the whole mapping information into the memory blocks, selecting a piece of victim mapping information among the partial mapping information stored in the internal cache memory, and removing the piece of victim mapping information based on logical addresses of the commands stored in the command queue.

The controller sequentially may select, when there is a need to select a piece of victim mapping information among the partial mapping information stored in the internal cache memory and to remove the piece of victim mapping information, as a piece of selected mapping information the partial mapping information stored in the internal cache memory according to a predetermined selection algorithm, determines whether a logical address of the piece of selected mapping information corresponds to any one among the logical addresses of the commands stored in the command queue, and selects the piece of selected mapping information as the piece of victim mapping information according to a result of the determination.

The controller may not select, when the logical address of the piece of selected mapping information is determined to correspond to any one among the logical addresses of the commands stored in the command queue, the piece of selected mapping information as the piece of victim mapping information.

The controller may select, when the logical address of the piece of selected mapping information is determined not to correspond to any one among the logical addresses of the commands stored in the command queue, the piece of selected mapping information as the piece of victim mapping information.

The controller may generate a logical address list, in which values of logical addresses of the commands stored in the command queue are arranged in order, and determines whether the logical address of the piece of selected mapping information corresponds to any one among the values in the logical address list through a binary search scheme or a linear search scheme.

The controller may select, when there is a need to select a piece of victim mapping information among the partial mapping information stored in the internal cache memory and to remove the piece of victim mapping information, the piece of victim mapping information among the partial mapping information stored in the internal cache memory according to a predetermined selection algorithm, determines whether a logical address of the piece of victim mapping information corresponds to any one among the logical addresses of the commands stored in the command queue, and assigns a physical address of the piece of victim mapping information to the commands stored in the command queue.

The controller may assign, when the logical address of the piece of victim mapping information is determined to correspond to any one among the logical addresses of the commands stored in the command queue, the physical address of the piece of victim mapping information to a command having a logical address corresponding to the logical address of the piece of victim mapping information.

The controller may generate a logical address list, in which values of logical addresses of the commands stored in the command queue are arranged in order, and determines whether the logical address of the piece of victim mapping information corresponds to any one among the values in the logical address list through a binary search scheme or a linear search scheme.

The controller may control, when the controller searches a logical address of an output command of the command queue in the partial mapping information stored in the internal cache memory in order to use the output command in the nonvolatile memory device but fails to find the logical address of the output command from the partial mapping information stored in the internal cache memory, the nonvolatile memory device to load and store into the internal cache memory a piece of mapping information corresponding to the output command among the whole mapping information stored in the memory blocks, and selects and removes the piece of victim mapping information among the partial mapping information stored in the internal cache memory in order to keep a number of the partial mapping information stored in the internal cache memory equal to or under a predetermined number.

The controller may select and remove, when the controller searches a logical address of an output command of the command queue in the partial mapping information stored in the internal cache memory in order to use the output command in the nonvolatile memory device but fails to find the logical address of the output command from the partial mapping information stored in the internal cache memory, the piece of victim mapping information among the partial mapping information stored in the internal cache memory, and controls the nonvolatile memory device to load and store into the internal cache memory a piece of mapping information corresponding to the output command among the whole mapping information stored in the memory blocks.

In accordance with an embodiment of the present invention, an operating method of a memory system including a non-volatile memory device including a plurality of memory blocks and a command queue adapted to store commands requested from a host, the method may include: managing plural pieces of mapping information for mapping logical addresses to physical addresses, and storing partial mapping information into an internal cache memory and the whole mapping information into the memory blocks; and selecting a piece of victim mapping information among the partial mapping information stored in the internal cache memory to remove the piece of victim mapping information based on logical addresses of the commands stored in the command queue.

The controlling of the operation may include: a first selection step of sequentially selecting, when there is a need to select a piece of victim mapping information among the partial mapping information stored in the internal cache memory and to remove the piece of victim mapping information, as a piece of selected mapping information the partial mapping information stored in the internal cache memory according to a predetermined selection algorithm; and a second selection step of determining whether a logical address of the piece of selected mapping information corresponds to any one among the logical addresses of the commands stored in the command queue, and selecting the piece of selected mapping information as the piece of victim mapping information according to a result of the determination.

The second selection step may not select, when the logical address of the piece of selected mapping information is determined to correspond to any one among the logical addresses of the commands stored in the command queue, the piece of selected mapping information as the piece of victim mapping information.

The second selection step may select, when the logical address of the piece of selected mapping information is determined not to correspond to any one among the logical addresses of the commands stored in the command queue, the piece of selected mapping information as the piece of victim mapping information.

The second selection step may include: generating a logical address list, in which values of logical addresses of the commands stored in the command queue are arranged in order; and determining whether the logical address of the piece of selected mapping information corresponds to any one among the values in the logical address list through a binary search scheme or a linear search scheme.

The controlling of the operation of the selecting may include: a third selection step of selecting, when there is a need to select a piece of victim mapping information among the partial mapping information stored in the internal cache memory and to remove the piece of victim mapping information, the piece of victim mapping information among the partial mapping information stored in the internal cache memory according to a predetermined selection algorithm; and a fourth step of determining whether a logical address of the piece of victim mapping information corresponds to any one among the logical addresses of the commands stored in the command queue, and assigning a physical address of the piece of victim mapping information to the commands stored in the command queue.

The fourth step may assign, when the logical address of the piece of victim mapping information is determined to correspond to any one among the logical addresses of the commands stored in the command queue, the physical address of the piece of victim mapping information to a command having a logical address corresponding to the logical address of the piece of victim mapping information.

The fourth step may include: generating a logical address list, in which values of logical addresses of the commands stored in the command queue are arranged in order; and determining whether the logical address of the piece of victim mapping information corresponds to any one among the values in the logical address list through a binary search scheme or a linear search scheme.

The operating method may further include controlling, when the controller searches a logical address of an output command of the command queue in the partial mapping information stored in the internal cache memory in order to use the output command in the nonvolatile memory device but fails to find the logical address of the output command from the partial mapping information stored in the internal cache memory, the nonvolatile memory device to load and store into the internal cache memory a piece of mapping information corresponding to the output command among the whole mapping information stored in the memory blocks; and removing the piece of victim mapping information selected by the controlling of the operation of the selecting in order to keep a number of the partial mapping information stored in the internal cache memory equal to or under a predetermined number after the storing of the partial mapping information into the internal cache memory.

The operating method may further include removing, when the controller searches a logical address of an output command of the command queue in the partial mapping information stored in the internal cache memory in order to use the output command in the nonvolatile memory device but fails to find the logical address of the output command from the partial mapping information stored in the internal cache memory, the piece of victim mapping information selected by the controlling of the operation of the selecting; and controlling the nonvolatile memory device to load and store into the internal cache memory a piece of mapping information corresponding to the output command among the whole mapping information stored in the memory blocks after the removing of the piece of victim mapping information.

In accordance with an embodiment of the present invention, a memory system may include: a nonvolatile memory device including a plurality of memory blocks; and a controller, including a command queue, suitable for sequentially executing entered commands and a cache memory for storing a map data used in execution of the entered commands, wherein, when a portion of the cache memory is required to be emptied, the controller determines whether a portion of the map data is maintained in the cache memory based on logical addresses of the commands stored in the command queue.

BRIEF DESCRIPTION OF THE DRAWINGS

The description herein makes reference to the accompanying drawings wherein like reference numerals refer to like parts throughout the several views, and wherein:

FIGS. 7 to 9A are schematic diagrams illustrating an operation of managing mapping information in cache memory of the memory system, in accordance with an embodiment of the disclosure;

DETAILED DESCRIPTION

Figure 1:
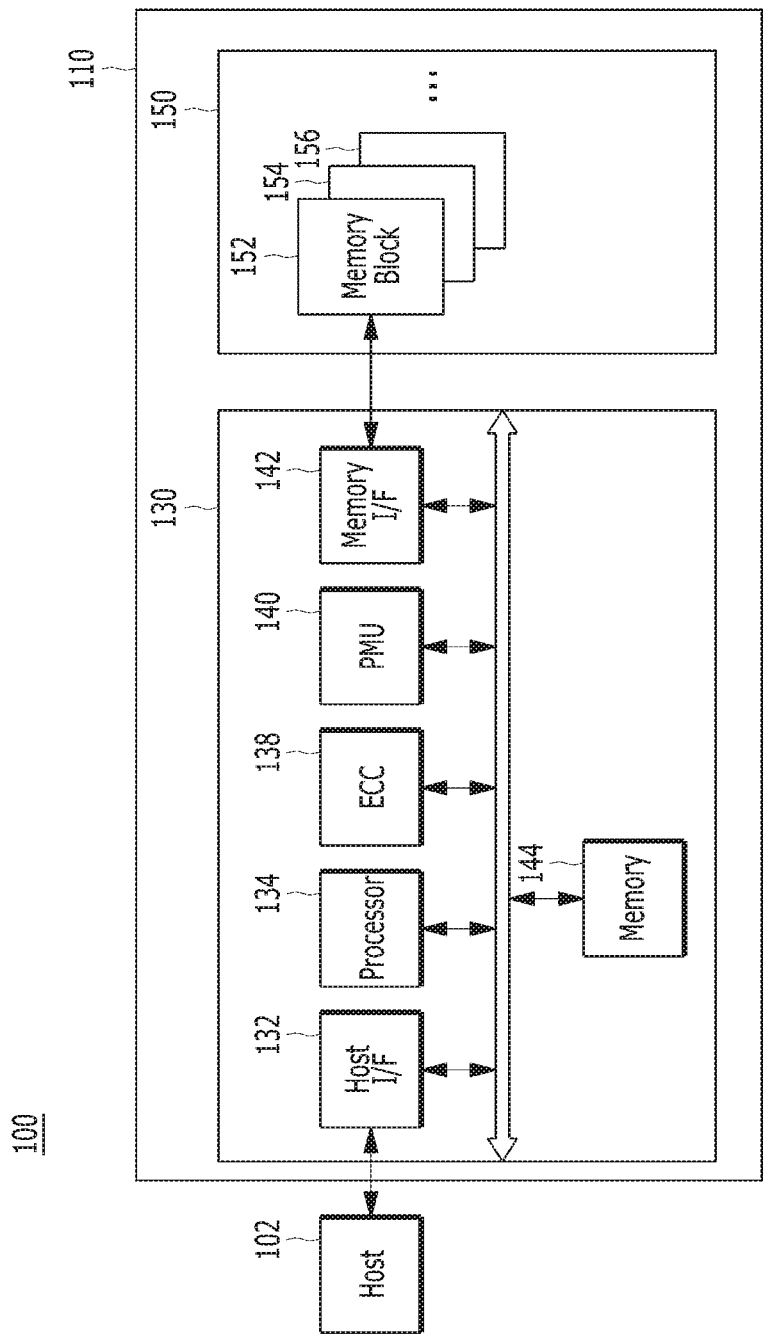
FIG. 1 is a simplified, block diagram illustration, of a data processing system including a memory system operatively coupled to a host, in accordance with an embodiment of the disclosure.

Various examples of the disclosure of the present invention are described below in more detail with reference to the accompanying drawings. The disclosure may be embodied in different other embodiments, forms and variations thereof and should not be construed as being limited to the embodiments set forth herein. Rather, the described embodiments are provided so that this disclosure will be thorough and complete, and will fully convey the disclosure to those skilled in the art to which this invention pertains. Throughout the disclosure, like reference numerals refer to like parts throughout the various figures and examples of the disclosure.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

It further noted that the expressions, "by the way of example but not limitation," "for example," "for instance," and/or the like are used herein interchangeably.

FIG. 1 is a simplified block diagram illustrating a data processing system 100 in accordance with an embodiment of the disclosure of the present invention.

Referring to FIG. 1, the data processing system 100 may include a host 102 electrically coupled to a memory system 110.

The host 102 may include, for example, a portable electronic device such as a mobile phone, an MP3 player and a laptop computer or an electronic device such as a desktop computer, a game player, a TV, a projector and/or the like.

By the way of example but not limitation, the memory system 110 may operate or perform a specific function or operation in response to a request from the host 102. Particularly, the memory system 110 may store data to be accessed and read by the host 102. The memory system 110 may be used as a main memory system or an auxiliary memory system of the host 102. The memory system 110 may be implemented with any one of various types of storage devices, which may be electrically coupled with the host 102 under at least one protocol supported by a host interface. Examples of suitable storage devices may include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and/or the like.

The storage devices for the memory system 110 may be implemented with a volatile memory device and/or a non-volatile memory device. Here, the volatile memory device may include a dynamic random-access memory (DRAM) and a static RAM (SRAM). The nonvolatile memory device may include a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory.

The memory system 110 may include a memory device 150, which is capable of storing data to be accessed by the host 102, and a controller 130 which may control storage of data in the memory device 150.

In accordance with an embodiment, the controller 130 and the memory device 150 may be integrated into a single semiconductor device, which may be included in the various types of memory systems as exemplified above. By the way of example but not limitation, the controller 130 and the memory device 150 may be mounted on a single circuit board, or they may be fabricated in a single chip.

By the way of example but not limitation, the memory system 110 may be configured as a part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may retain data stored therein even while an electrical power is not supplied. For example, the memory device 150 may be a nonvolatile memory device.

The memory device 150 may store data provided from the host 102 through a write operation. The memory device 150 may output data stored therein to the host 102 through a read operation. The memory device 150 may include a plurality of memory blocks 152 to 156. Each of the memory blocks 152 to 156 may include a plurality of pages. Each of the plurality of pages may include a plurality of memory cells coupled to each other via a single word line (WL). In another embodiment, each page may include a plurality of memory cells coupled to at least two word lines (WLs).

The controller 130 may control one or more operations of the memory device 150, such as read, write, program and erase operations. By the way of example but not limitation, the controller 130 of the memory system 110 may control the memory device 150 to perform an operation in response to a request received from the host 102. The controller 130 may provide the data, read from the memory device 150, to the host 102, and/or may store the data, entered from the host 102, into the memory device 150.

The controller 130 may include a host interface (I/F) unit 132, a processor 134, an error correction code (ECC) unit 138, a power management unit (PMU) 140, a memory device controller such as a memory interface (I/F) unit 142 and a memory 144. Each of the components of the controller 130 may be electrically coupled, or engaged with, each other via an internal bus. The internal bus may include one or more signal lines.

The host interface unit 132 may process commands and/or data provided from the host 102, and may communicate with the host 102 according to at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (TATA), small computer system interface (SCSI), enhanced small disk interface (ESDI), integrated drive electronics (IDE), and/or the like.

The ECC unit 138 may detect and correct errors in the data read from the memory device 150 during the read operation. When the number of the error bits is greater than a threshold number of correctable error bits, the ECC unit 138 may not correct error bits. If not correcting error bits, the ECC unit 138 may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and/or the like. The ECC unit 138 may include all or some of circuits, modules, systems or devices for performing the error correction operation based on at least one of the above described codes.

The PMU 140 may manage the controller 130 electrical power supply and use. One or more power lines (not shown) may allow power supply to the various components of the controller under the management of the PMU 140.

The memory interface 142 may serve as an interface for handling commands and data transferred between the controller 130 and the memory device 150, so as to allow the controller 130 to control the memory device 150 in response to a request delivered from the host 102. The memory interface 142 may generate a control signal for the memory device 150 and may process data entered into or outputted from the memory device 150 under the control of the processor 134. The memory interface 142 may be any suitable interface depending upon the type of the memory device 150. For example, in an embodiment where the memory device 150 is a flash memory such as a NAND flash memory, then the memory interface may be a NAND flash memory interface. Such memory interfaces are well known in the art, and, hence, they are not described herein in any detail.

The memory 144 (also referred to as a controller memory) may serve as a working memory of the memory system 110 and the controller 130. The memory 144 may store temporary or transactional data for operating or driving the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data required for the controller 130 and the memory device 150 to perform these operations.

The memory 144 may be implemented with a volatile memory. The memory 144 may be implemented with a static random-access memory (SRAM) or a dynamic random-access memory (DRAM). Although FIG. 1 exemplifies the memory 144 being disposed within the controller 130, the present invention is not limited thereto. For example, the memory 144 may be located inside or outside the controller 130. For instance, the memory 144 may be embodied by an external volatile memory having a memory interface transferring data and/or signals transferred between the memory 144 and the controller 130.

The processor 134 may control the one or more operations of the memory system 110. The processor 134 may use or execute a firmware to control the one or more operations of the memory system 110. The firmware may be a flash translation layer (FTL).

The firmware may perform an operation as an interface between the host 102 and the memory device 150. The host 102 may transmit requests for write and read operations to the memory device 150 via an application layer. Host's requests may be recognized and translated through the firmware (e.g., an FTL) for operations at a physical level in the memory device 150.

The firmware (e.g., the FTL) may manage operations of address mapping, garbage collection, wear-leveling and/or the like. The firmware may store map data. Therefore, the controller 130 may map a logical address, which is entered with a command and a data from the host 102, to a physical address of the memory device 150 based on the map data. Because of this address mapping/conversion operation, the memory device 150 may perform an operation such as a read or a write operation like a general memory device without showing its own distinct or unique characteristics. Also, through the address mapping operation based on the map data, when the controller 130 updates data of a specific page, the controller 130 may program new data on another empty page and may invalidate old data of the specific page due to a characteristic of a flash memory device. Further, the controller 130 may store map data of the new data into the firmware.

The processor 134 may be implemented with a microprocessor and/or a central processing unit (CPU). The memory system 110 may include one or more processors 134.

A management unit (not shown) may be included in the processor 134. The management unit may perform bad block management of the memory device 150. The management unit may find bad memory blocks included in the memory device 150, which are in unsatisfactory condition for further use. The management unit may perform bad block management on the bad memory blocks. When the memory device 150 is a flash memory, for example, a NAND flash memory, a program failure may occur during the write operation, for example, during the program operation, due to characteristics of a NAND logic function. During the bad block management, the data in the program-failed memory block or the bad memory block may be programmed into a new memory block. The bad blocks may seriously aggravate the utilization efficiency of the memory device 150 having a 3D stack structure as well as the reliability of the memory system 100. Thus, reliable bad block management is typically required.

Figure 2:
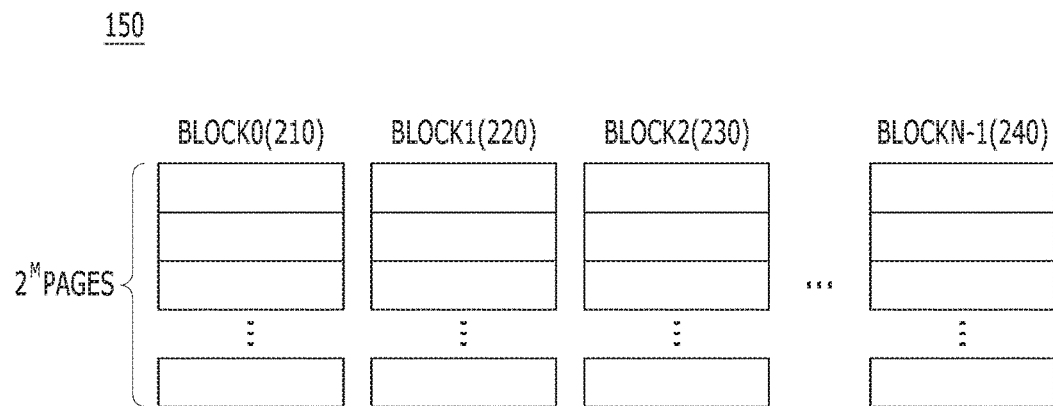
FIG. 2 is a schematic diagram illustrating an exemplary configuration of a memory device of the memory system shown in FIG. 1, in accordance with an embodiment of the disclosure.

FIG. 2 is a simplified schematic diagram illustrating an exemplary configuration of the memory device 150.

Referring to FIG. 2, the memory device 150 may include a plurality of memory blocks BLOCK 0 to BLOCKN-1, and each of the blocks BLOCK 0 to BLOCKN-1 may include a plurality of pages, for example, $2^M$ pages. The number of memory blocks and of the pages in each block may vary according to circuit design. The memory blocks may be single level cell (SLC) memory blocks and/or multi-level cell (MLC) memory blocks, according to the number of bits which may be stored or expressed in each memory cell. The SLC memory block may include a plurality of pages which are implemented with memory cells, each capable of storing 1-bit data. The MLC memory block may include a plurality of pages which are implemented with memory cells, each capable of storing multi-bit data, for example, two or more-bit data. An MLC memory block including a plurality of pages which are implemented with memory cells that are each capable of storing 3-bit data may also be referred to as a triple level cell (TLC) memory block.

Figure 3:
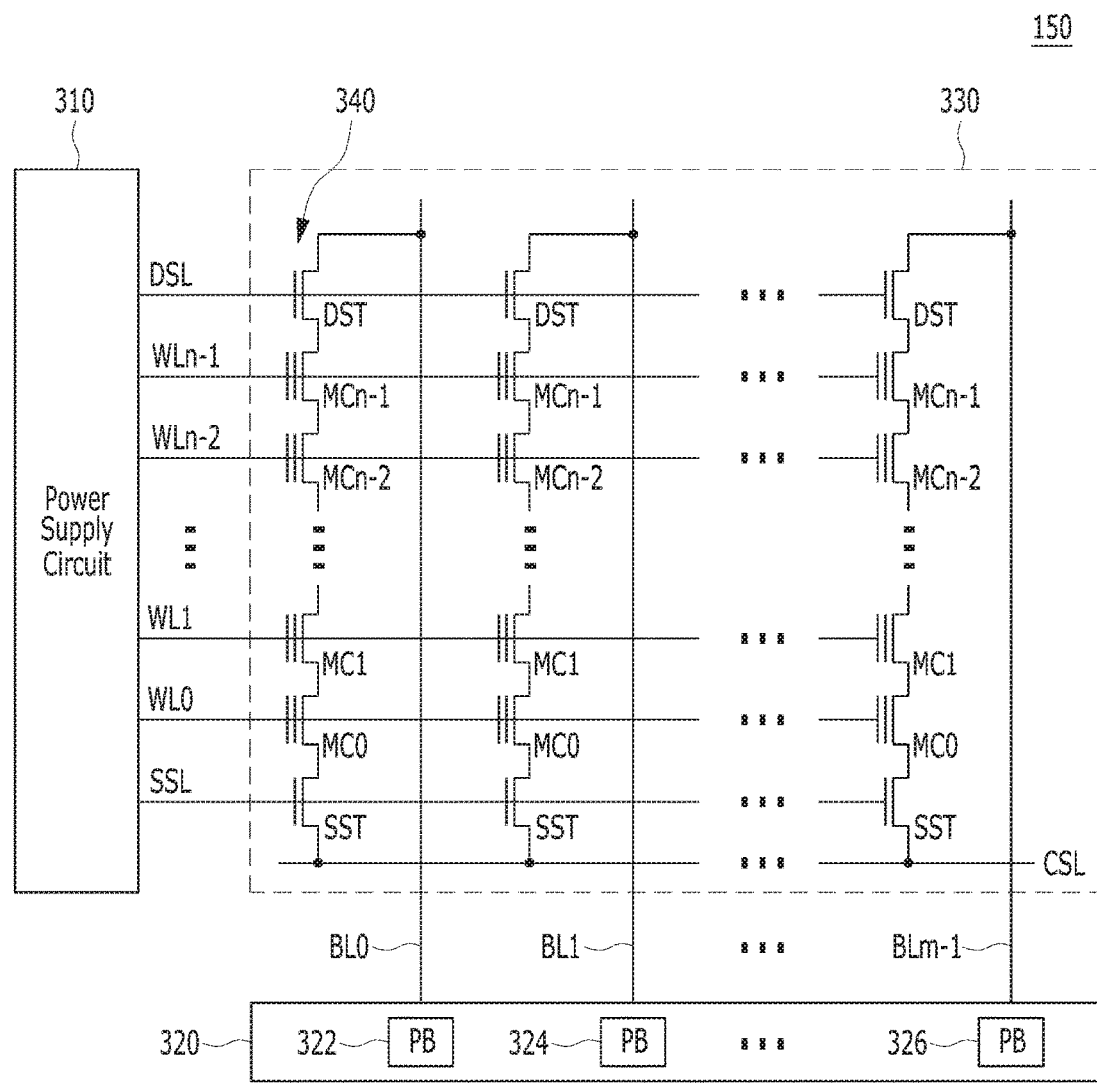
FIG. 3 is a circuit diagram illustrating an exemplary configuration of a memory cell array of a memory block in the memory device shown in FIG. 2, in accordance with an embodiment of the disclosure.

FIG. 3 is a simplified exemplary circuit diagram illustrating a memory block 330 in the memory device 150.

Referring to FIG. 3, the memory block 330 may correspond to any of the plurality of memory blocks 152 to 156.

Referring to FIG. 3, the memory block 330 of the memory device 150 may include a plurality of cell strings 340 which are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by single level cells (SLC), each storing 1-bit information, or by multi-level cells (MLC), each storing multi-bit information. The strings 340 may be electrically coupled to the corresponding bit lines BL0 to BLm-1, respectively. For reference, in FIG. 3, 'DSL' denotes a drain select line, 'SSL' denotes a source select line, and 'CSL' denotes a common source line.

While FIG. 3 only shows, as an example, that the memory block 330 is constituted with NAND flash memory cells, it is to be noted that the memory block 330 of the memory device 150 according to the embodiment is not limited to a NAND flash memory. The memory block 330 may be realized by a NOR flash memory, a hybrid flash memory in which at least two kinds of memory cells are combined, or one-NAND flash memory in which a controller is built in a memory chip. The operational characteristics of a semiconductor device may be pertinent to not only a flash memory device in which a charge storing layer is configured by conductive floating gates but also a charge trap flash (CTF) in which a charge storing layer is configured by a dielectric layer.

By the way of example but not limitation, a power supply circuit 310 of the memory device 150 may generate different-level word line voltages, for example, a program voltage, a read voltage and a pass voltage, which may be selectively supplied to each of word lines according to an operation mode and a voltage supplied to bulks. The bulks may include well regions in which the memory cells are formed. The power supply circuit 310 may perform a voltage generating operation under the control of a control circuit (not shown). The power supply circuit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification operation or a normal read operation, the read/write circuit 320 may operate as a sense amplifier for reading data from the memory cell array. During a program operation, the read/write circuit 320 may work as a write driver for driving bit lines according to data to be stored in the memory cell array. During a program operation, the read/write circuit 320 may receive from a buffer (not illustrated) data to be stored into the memory cell array, and supply into bit lines a voltage or a current determined according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 4:
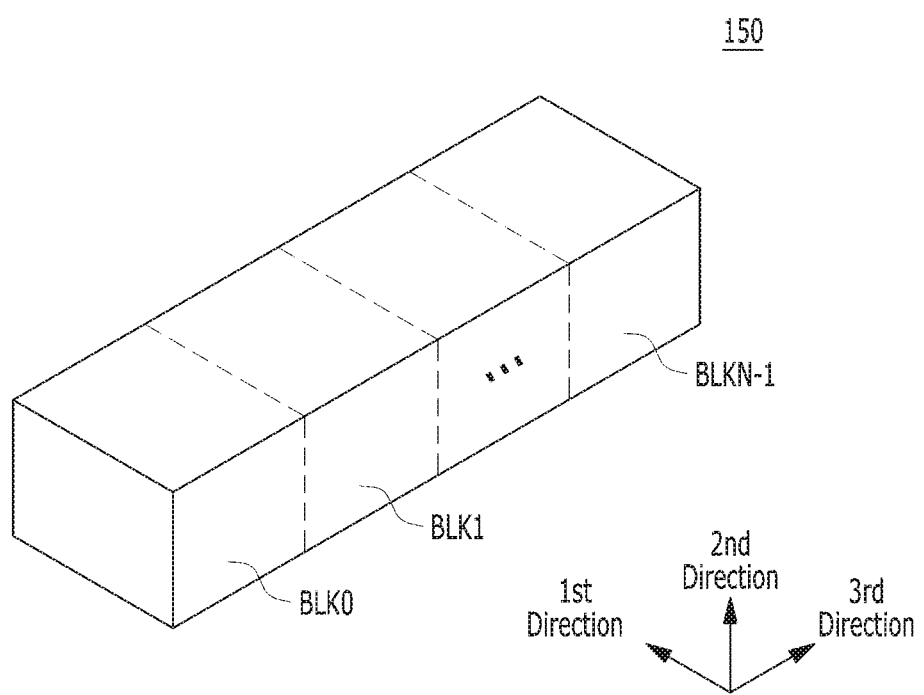
FIG. 4 is a schematic diagram illustrating an exemplary three-dimensional structure of the memory device shown in FIG. 2, in accordance with an embodiment of the disclosure.

FIG. 4 is a schematic diagram illustrating a 3D structure of the memory device 150.

The memory device 150 may be embodied by a 2D or 3D memory device. Specifically, as illustrated in FIG. 4, the memory device 150 may be embodied in a nonvolatile memory device having a 3D stack structure. In an embodiment, the memory device 150 may have a 3D structure, and the memory device 150 may include a plurality of memory blocks BLK0 to BLKN−1 each having a 3D structure (or a vertical structure).

Figure 5:
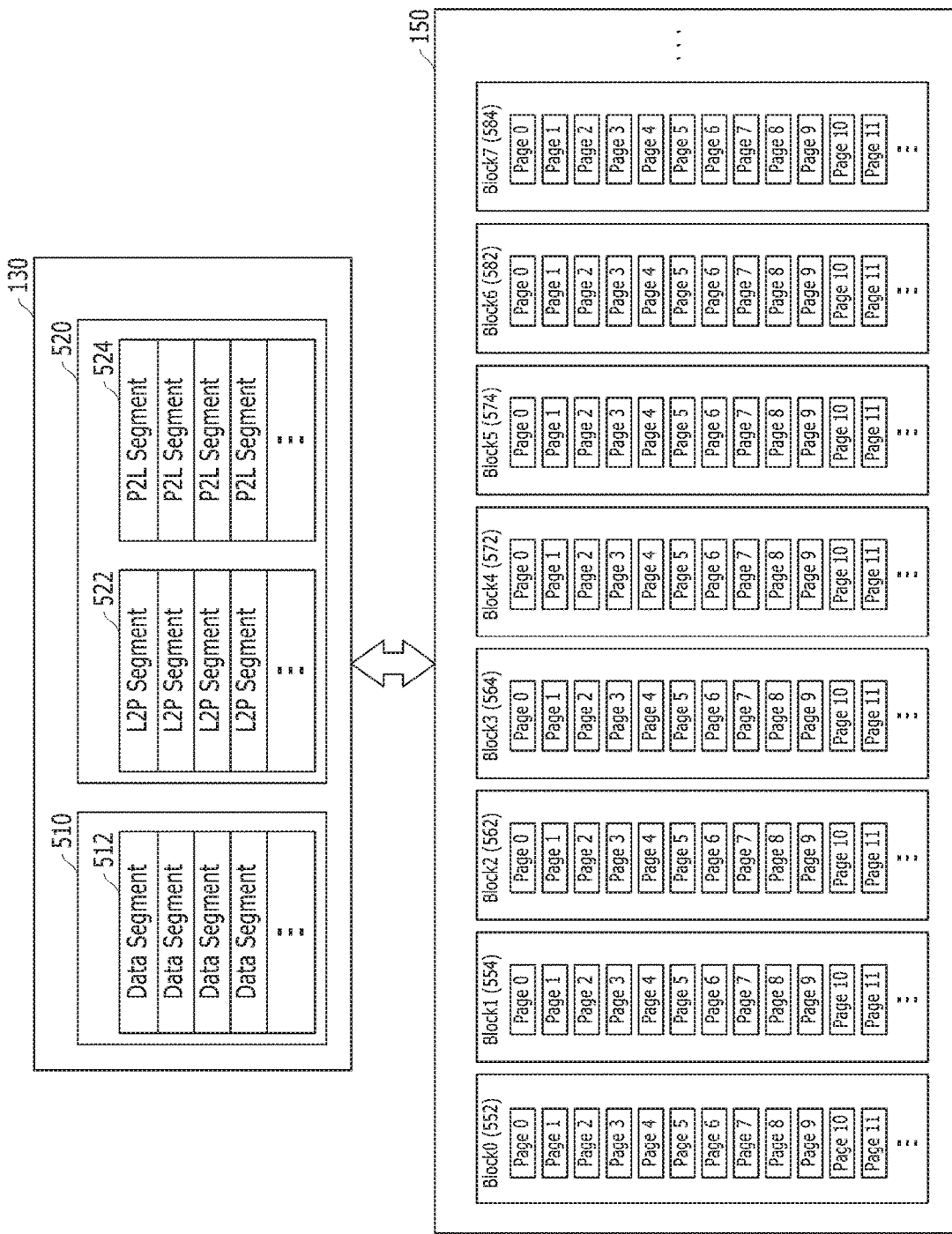
FIG. 5 is a diagram illustrating a data processing operation of a memory system, in accordance with an embodiment of the disclosure.

FIG. 5 is a simplified diagram illustrating an exemplary data processing operation of a memory system, in accordance with an embodiment of the disclosure.

Referring to FIG. 5, the controller 130 may perform a command operation corresponding to a command entered from the host 102. By the way of example but not limitation, the controller 130 may perform a program operation corresponding to a program command received from the host 102. For example, according to a program operation in response to a program command received from the host 102, the controller 130 may program and store user data corresponding to the program command within a plurality of pages included in one or more memory blocks 552, 554, 562, 564, 572, 574, 582, 584 of the memory device 150. The memory blocks and the memory pages where the user data may be stored will correspond to an address provided by the host together with the command and the user data. The address provided by the host may be a logical address.

More specifically, the controller 130 may generate and update meta data for the user data, and then program and store the generated and updated meta data in the pages of the one or more memory blocks 552, 554, 562, 564, 572, 574, 582, 584 of the memory device 150. The meta data may include both Logical to Physical (L2P) information and Physical to Logical (P2L) information for the user data stored in the pages of the one or more memory blocks 552, 554, 562, 564, 572, 574, 582, 584. In addition, the meta data may include information on command data corresponding to the command received from the host 102, information on the command operation corresponding to the command, information on the memory blocks of the memory device 150 where the command operation is performed, and information on map data corresponding to the command operation. In other words, the meta data may include all information and data other than the user data corresponding to a command received from the host 102.

For example, the controller 130 may cache and buffer the user data corresponding to the program command received from the host 102 in a first buffer 510 included in the memory 144 of the controller 130. More specifically, the controller 130 may store data segments 512 of the user data in the first buffer 510. The first buffer 510 is a data buffer/cache. Subsequently, the controller 130 may program and store the data segments 512 stored in the first buffer 510 in the pages included in the one or more memory blocks 552, 554, 562, 564, 572, 574, 582, 584 of the memory device 150 according to the address provided by the host.

Since the data segments 512 of the user data are programmed and stored in the pages included in the one or more memory blocks 552, 554, 562, 564, 572, 574, 582, 584 of the memory device 150, the controller 130 may generate L2P segments 522 and P2L segments 524, which are the meta data, and store the generated L2P segments 522 and the generated P2L segments 524 in a second buffer 520 included in the memory 144 of the controller 130. The second buffer may be referred to as the meta data buffer 520. The L2P segments 522 and the P2L segments 524 may be stored in a list form in the second buffer 520 included in the memory 144 of the controller 130. Subsequently, the controller 130 may program and store the L2P segments 522 and the P2L segments 524 stored in the second buffer 520 in the pages included in the memory blocks 552, 554, 562, 564, 572, 574, 582, 584 of the memory device 150 through a map flush operation or a checkpoint operation.

In yet another example, the controller 130 may perform a read operation corresponding to a read command received from the host 102. For the read operation, the controller 130 may load L2P segments 522 and/or P2L segments 524 from the memory device 150 onto the second buffer 520, and check which one of the loaded L2P segments 522 and/or loaded P2L segments 524 are relevant to the user data corresponding to the read command. Subsequently, the controller 130 may read the data segments 512 of the user data from a storage location determined through the aforementioned check. For example, the controller 130 may read the data segments 512 of the user data from a specific page of a specific memory block among the memory blocks 552, 554, 562, 564, 572, 574, 582, 584 based on the aforementioned mapping checking operation wherein the controller determined a physical location corresponding to the logical address of the read command. The controller 130 may then store the data segments 512 of the read user data which correspond to the read command in the first buffer 510, i.e., in the user data buffer 510. Subsequently, the controller 130 may transfer the data segments 512 which are stored in the first buffer 510 to the host 102 via the host interface 132.

Figure 6:
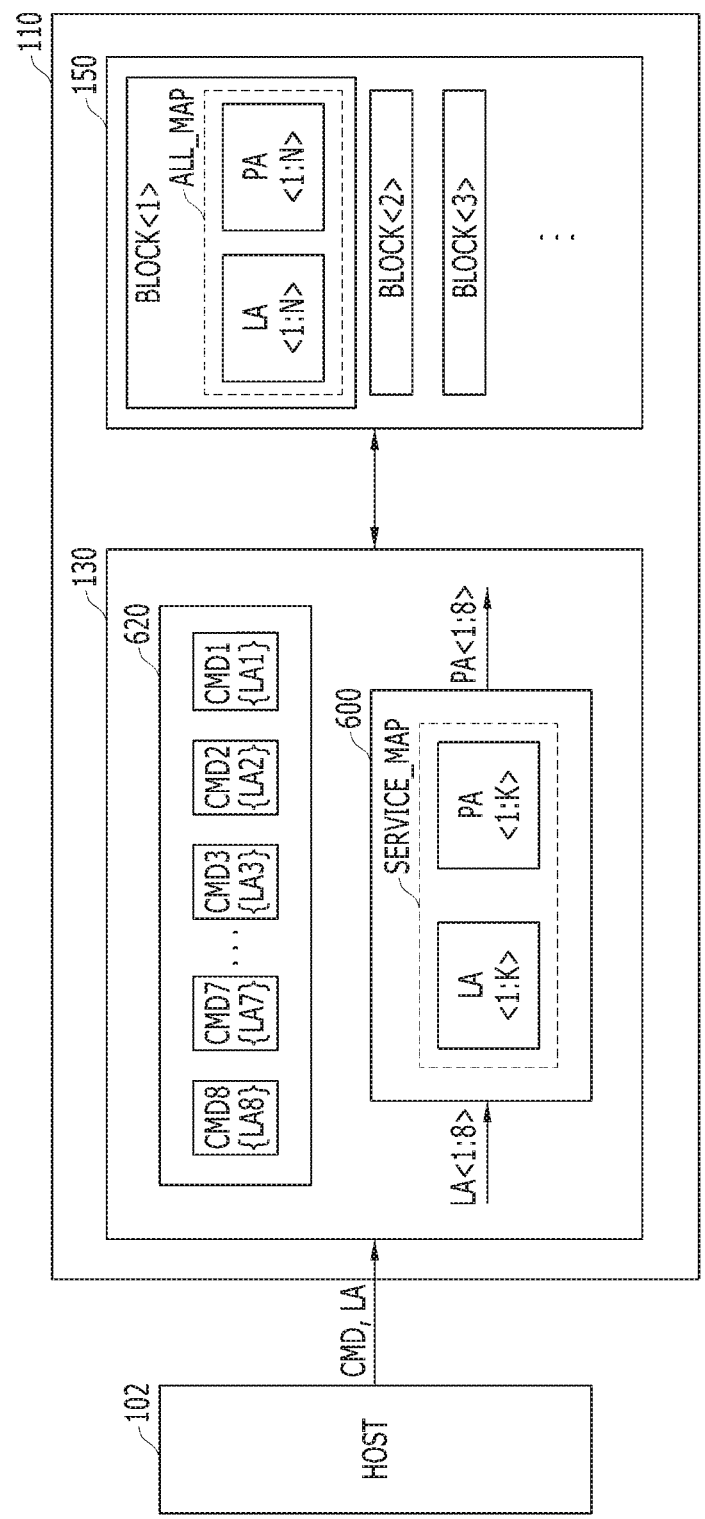
FIG. 6 is a schematic diagram illustrating an exemplary operation of a memory system, in accordance with an embodiment of the disclosure.

FIG. 6 is a simplified schematic diagram illustrating an operation of the memory system, in accordance with an embodiment of the disclosure.

FIGS. 7 to 9A are diagrams illustrating a managing mapping information operation in cache memory of the memory system, in accordance with an embodiment of the disclosure. FIG. 9B is a flowchart illustrating a managing mapping information operation in cache memory of the memory system, in accordance with an embodiment of the disclosure.

Referring to FIG. 6, the memory system 110 may include the nonvolatile memory device 150 as shown in FIG. 1.

The nonvolatile memory device 150 may include a plurality of memory blocks BLOCK<1:3, . . . > as described with reference to FIG. 1.

FIG. 6 shows the memory system 110 including a single nonvolatile memory device 150, which is merely an example. The memory system 110 may include a plurality of nonvolatile memory devices.

Even though the host interface 132, the processor 134, the ECC unit 138, the power management unit 140, the NAND flash controller 142 and the memory 144, which are described with reference to FIG. 1, are not included in the controller 130 in FIG. 5, this is just for convenience of description. According to an embodiment, the host interface 132, the processor 134, the ECC unit 138, the power management unit 140, the NAND flash controller 142 and the memory 144, which are described with reference to FIG. 1, may be included in the controller 130 in FIG. 5.

In accordance with an embodiment of the disclosure, the memory system 110 may include the nonvolatile memory device 150 and the controller 130. The nonvolatile memory device 150 may include a plurality of memory blocks BLOCK<1:3, . . . >. The controller 130 may manage plural pieces of mapping information ALL_MAP for mapping of the logical addresses LA of commands CMD from the host 102 to the physical addresses PA. The whole mapping information ALL_MAP may be the map segments including all the meta-data (i.e., the L2P segments 522 and the P2L segments 524 described with reference to FIG. 5). The whole mapping information ALL_MAP is schematically illustrated in FIG. 6 for convenience of description.

The controller 130 may further include a command queue 620 configured to store a predetermined number of commands CMD<1:8> requested from the host 102. Logical addresses LA<1:8> corresponding to the command requests of the host 102 may be assigned to the predetermined number of commands CMD<1:8> stored in the command queue 620, respectively. It is exemplified that the predetermined number of commands CMD<1:8> stored in the command queue 620 is eight (8), which is merely an example. The command queue 620 may store more or less commands than the eight (8) numbers of commands CMD<1:8> by design.

The controller 130 may store partial mapping information SERVICE_MAP among the whole mapping information ALL_MAP into the internal cache memory 600, and may store the whole mapping information ALL_MAP as a whole into the plurality of memory blocks BLOCK<1:3, . . . >. It is assumed that the internal cache memory 600 has a memory space that is not large enough for storing the whole mapping information ALL_MAP as a whole but is large enough for storing the partial mapping information SERVICE_MAP. For example, when assumed that the whole mapping information ALL_MAP is N numbers of mapping information LA<1:N> & PA<1:N> as illustrated in FIG. 6, the internal cache memory 600 may store K numbers of mapping information LA<1:K> & PA<1:K> as the partial mapping information SERVICE_MAP, wherein K is less than N. It is exemplified that the whole mapping information ALL_MAP is stored in a first memory block BLOCK<1> of the nonvolatile memory device 150, which is merely an example. For example, in another embodiment, the plural pieces of mapping information ALL_MAP may be distributed and stored into a plurality of memory blocks.

Therefore, when the controller 130 fails to detect a piece of mapping information LA<1:8> & PA<1:8>, corresponding to the predetermined number of commands CMD<1:8> stored in the command queue 620, at the internal cache memory 600, the controller 130 may load the detection-failed mapping information LA<1:8> & PA<1:8> corresponding to the predetermined number of commands CMD<1:8> stored in the command queue 620 from the whole mapping information ALL_MAP stored in the plurality of memory blocks BLOCK<1:3, . . . > of the nonvolatile memory device 150. The controller 130 may store the loaded mapping information LA<1:8> & PA<1:8> into the internal cache memory 600. The controller 130 may control the nonvolatile memory device 150 to perform an operation in response to the predetermined number of commands CMD<1:8> stored in the command queue 620, using the piece of mapping information LA<1:8> & PA<1:8> corresponding to the predetermined number of commands CMD<1:8> stored in the command queue 620. The piece of mapping information LA<1:8> & PA<1:8> are loaded from the whole mapping information ALL_MAP stored in the plurality of memory blocks BLOCK<1:3, . . . > of the nonvolatile memory device 150 to be stored into the internal cache memory 600.

Here, since the internal cache memory 600 does not have enough memory space to store the whole mapping information ALL_MAP as a whole, the controller 130 may update the partial mapping information SERVICE_MAP to be stored into the internal cache memory 600 according to the Least Recently Used (LRU) algorithm.

There may be two (2) operations that the controller 130 can update the list of the partial mapping information SERVICE_MAP.

According to a first operation, the controller 130 may try to detect the pieces of mapping information LA<1:8> & PA<1:8>, corresponding to the predetermined number of commands CMD<1:8> stored in the command queue 620, from the internal cache memory 600 in order to control the nonvolatile memory device 150 to perform an operation in response to the predetermined number of commands CMD<1:8> stored in the command queue 620. But, when the controller 130 fails to detect a piece of mapping information LA<1:8> & PA<1:8>, the controller 130 may control the nonvolatile memory device 150 to load the detection-failed mapping information LA<1:8> & PA<1:8> from the whole mapping information ALL_MAP, stored in the plurality of memory blocks BLOCK<1:3, . . . > of the nonvolatile memory device 150, to store the loaded mapping information LA<1:8> & PA<1:8> into the internal cache memory 600. Then, for keeping the number of partial mapping information SERVICE_MAP under a predetermined number in the internal cache memory 600, the controller 130 may select a piece of victim mapping information (not illustrated) among the partial mapping information SERVICE_MAP stored in the internal cache memory 600 and remove the selected victim mapping information.

According to a second operation, the controller 130 may try to detect the pieces of mapping information LA<1:8> & PA<1:8> corresponding to the predetermined number of commands CMD<1:8> stored in the command queue 620 from the internal cache memory 600 in order to control the nonvolatile memory device 150 to perform an operation in response to the predetermined number of commands CMD<1:8> stored in the command queue 620. When the controller 130 fails to detect a piece of mapping information LA<1:8> & PA<1:8> from the internal cache memory 600, the controller 130 may select a piece of victim mapping information (not illustrated) among the partial mapping information SERVICE_MAP stored in the internal cache memory 600 and remove the selected victim mapping information. Then, the controller 130 may control the nonvolatile memory device 150 to load the detection-failed mapping information LA<1:8> & PA<1:8> from the whole mapping information ALL_MAP stored in the plurality of memory blocks BLOCK<1:3, . . . > of the nonvolatile memory device 150 to store the loaded mapping information LA<1:8> & PA<1:8> corresponding to the predetermined number of commands CMD<1:8> stored in the command queue 620 into the internal cache memory 600.

The controller 130 may select the victim mapping information according to the LRU algorithm, which means that the controller 130 may select the least recently used mapping information as the victim mapping information among the partial mapping information SERVICE_MAP.

As described above, the controller 130 may update the victim mapping information, that is, may select and remove the victim mapping information from the partial mapping information SERVICE_MAP stored in the internal cache memory 600. The controller 130 may select the victim mapping information according to the LRU algorithm, as illustrated in FIG. 7.

Figure 7:
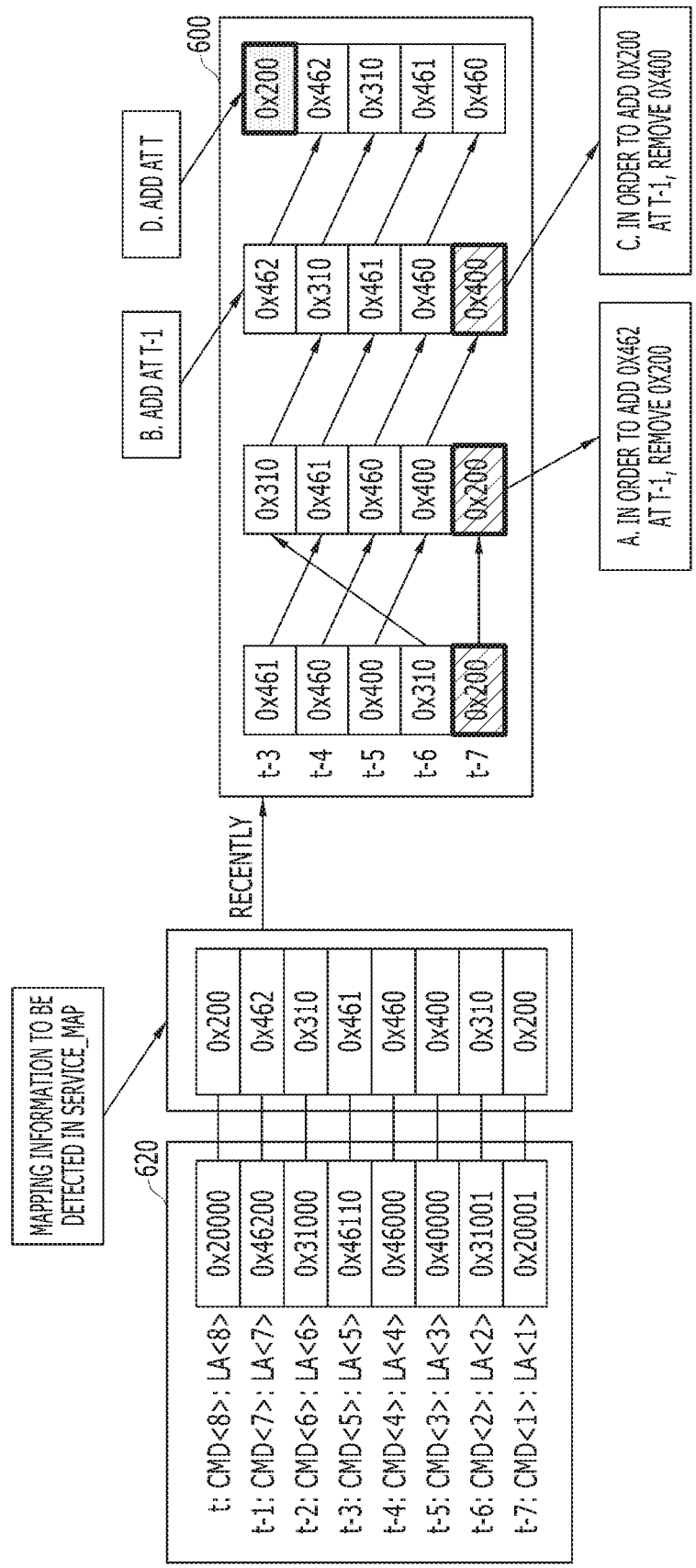

FIG. 7 illustrates the predetermined number of commands CMD<1:8> stored in the command queue 620, the logical addresses LA<1:8> corresponding to the predetermined number of commands CMD<1:8> and mapping information that should be detected for the logical addresses LA<1:8> from the partial mapping information SERVICE_MAP stored in the internal cache memory 600 and that are arranged with time points t-7, t-6, t-5, t-4, t-3, t-2, t-1, t according to the output sequence from the command queue 620.

In detail, a first logical address LA<1> corresponding to a first command CMD<1> as a first output of the command queue 620 may have a value of '0x20001' and be outputted at the time point t-7. Mapping information that should be detected for the value of '0x20001' of the first logical address LA<1> from the internal cache memory 600 has a value of '0x200.'

Also, a second logical address LA<2> corresponding to a second command CMD<2> as a second output of the command queue 620 may have a value of '0x31001' and may be outputted at the time point t-6. Mapping information that should be detected for the value of '0x31001' of the second logical address LA<2> from the internal cache memory 600 has a value of '0x310.'

Also, a third logical address LA<3> corresponding to a third command CMD<3> as a third output of the command queue 620 may have a value of '0x40000' and may be outputted at the time point t-5. Mapping information that should be detected for the value of '0x40000' of the third logical address LA<3> from the internal cache memory 600 has a value of '0x400.'

Also, a fourth logical address LA<4> corresponding to a fourth command CMD<4> as a fourth output of the command queue 620 may have a value of '0x46000' and may be outputted at the time point t-4. Mapping information that should be detected for the value of '0x46000' of the fourth logical address LA<4> from the internal cache memory 600 has a value of '0x460.'

Also, a fifth logical address LA<5> corresponding to a fifth command CMD<5> as a fifth output of the command queue 620 may have a value of '0x46110' and may be outputted at the time point t-3. Mapping information that should be detected for the value of '0x46110' of the fifth logical address LA<5> from the internal cache memory 600 has a value of '0x461.'

Also, a sixth logical address LA<6> corresponding to a sixth command CMD<6> as a sixth output of the command queue 620 may have a value of '0x31000' and may be outputted at the time point t-2. Mapping information that should be detected for the value of '0x31000' of the sixth logical address LA<6> from the internal cache memory 600 has a value of '0x310.'

Also, a seventh logical address LA<7> corresponding to a seventh command CMD<7> as a seventh output of the command queue 620 may have a value of '0x46200' and be outputted at the time point 't-1'. Mapping information that should be detected for the value of '0x46200' of the seventh logical address LA<7> from the internal cache memory 600 has a value of '0x462.'

Also, an eighth logical address LA<8> corresponding to an eighth command CMD<8> as an eighth output of the command queue 620 may have a value of '0x20000' and may be outputted the time point t. Mapping information that should be detected for the value of '0x20000' of the eighth logical address LA<8> from the internal cache memory 600 has a value of '0x200.'

In the above-described example, the piece of mapping information that should be detected for the logical addresses LA<1:8> from the internal cache memory 600 have the quotients of the values of the logical addresses LA<1:8> divided by a value of '0x100', as their respective values. This relationship between the values of the logical addresses LA<1:8> and the piece of mapping information that should be detected for the logical addresses LA<1:8> from the internal cache memory 600 are merely an example and may be changed in various ways. However, since the whole mapping information ALL_MAP and the partial mapping information SERVICE_MAP which are respectively stored in the plurality of memory blocks BLOCK<1:3, . . . > and the internal cache memory 600 are managed by units of segments, plural pieces of logical addresses may correspond to a single piece of mapping information that should be detected for the plural pieces of logical addresses from the internal cache memory 600. For example, the piece of mapping information that should be detected for the value of '0x20001' of the first logical address LA<1> from the internal cache memory 600 has the value of '0x200' at the time point t-7. The piece of mapping information that should be detected for the value of '0x20000' of the eighth logical address LA<8> from the internal cache memory 600 also has the value of '0x200' at the time point t-1. In the similar way, the piece of mapping information that should be detected for the value of '0x31001' of the second logical address LA<2> from the internal cache memory 600 has the value of '0x310' at the time point t-6. The piece of mapping information that should be detected for the value of '0x31000' of the sixth logical address LA<6> from the internal cache memory 600 also has the value of '0x310' at the time point t-2. The number of pieces of logical addresses corresponding to a single piece of mapping information that should be detected for the plural pieces of logical addresses from the internal cache memory 600 may vary according to system configuration or design.

It is exemplified that the number of partial mapping information SERVICE_MAP stored in the internal cache memory 600 is five (5), which is merely an example. The internal cache memory 600 may store more or less partial mapping information SERVICE_MAP than the five (5) numbers of partial mapping information SERVICE_MAP.

In detail, the internal cache memory 600 may be assumed not to store any mapping information before the time point t-7.

At the time point t-7, the piece of mapping information that should be detected for the value of '0x20001' of the first logical address LA<1>, which corresponds to the first command CMD<1> outputted from the command queue 620, from the partial mapping information SERVICE_MAP stored in the internal cache memory 600 has the value of '0x200.' At this time, the internal cache memory 600 does not store any mapping information, as assumed above. Therefore, the controller 130 may control the plurality of memory blocks BLOCK<1:3, . . . > to detect the piece of mapping information having the value of '0x200' from the whole mapping information ALL_MAP stored in the plurality of memory blocks BLOCK<1:3, . . . >. The controller 130 may store the detected mapping information having the value of '0x200' into the internal cache memory 600.

At the time point t-6, the piece of mapping information that should be detected for the value of '0x31001' of the second logical address LA<2>, which corresponds to the second command CMD<2> outputted from the command queue 620, from the partial mapping information SERVICE_MAP stored in the internal cache memory 600 has the value of '0x310.' At this time, only a single piece of mapping information having the value of '0x200' is stored in the internal cache memory 600, and the internal cache memory 600 has a memory space large enough to store 5 pieces of mapping information. Therefore, the controller 130 may control the plurality of memory blocks BLOCK<1:3, . . . > to detect the piece of mapping information having the value of '0x310' from the whole mapping information ALL_MAP stored in the plurality of memory blocks BLOCK<1:3, . . . >. The controller 130 may store the detected mapping information having the value of '0x310' into the internal cache memory 600.

At the time point t-5, the piece of mapping information that should be detected for the value of '0x40000' of the third logical address LA<3>, which corresponds to the third command CMD<3> outputted from the command queue 620, from the partial mapping information SERVICE_MAP stored in the internal cache memory 600 has the value of '0x400'. At this time, only two pieces of mapping information having the values of '0x200' and '0x310' are stored in the internal cache memory 600, and the internal cache memory 600 has a memory space enough to store 5 pieces of mapping information. Therefore, the controller 130 may control the plurality of memory blocks BLOCK<1:3, . . . > to detect the piece of mapping information having the value of '0x400' from the whole mapping information ALL_MAP stored in the plurality of memory blocks BLOCK<1:3, . . . >. The controller 130 may store the detected mapping information having the value of '0x400' into the internal cache memory 600.

At the time point t-3, Also, the internal cache memory 600 has a memory space enough to store 5 pieces of mapping information. Therefore, the controller 130 should select a piece of victim mapping information among the 5 pieces of mapping information having the values of '0x200,' '0x310,' '0x400,' '0x460,' '0x461' currently stored in the internal cache memory 600 according to the LRU algorithm in order to store additional piece of mapping information in the internal cache memory 600 after the time point t-3. Therefore, the controller 130 may select the least recently used mapping information, that is the piece of mapping information having the value of '0x200', as the victim mapping information among the 5 pieces of mapping information having the values of '0x200,' '0x310,' '0x400,' '0x460,' '0x461' currently stored in the internal cache memory 600 according to the LRU algorithm at the time point t-3. At the time point t-3, the controller 130 may not remove in advance the selected victim mapping information, that is the piece of mapping information having the value of '0x200', because there is a chance that the selected victim mapping information (i.e., the piece of mapping information having the value of '0x200') is used before removal thereof after the time point t-3.

At the time point t-2, the piece of mapping information that should be detected for the value of '0x31000' of the sixth logical address LA<6>, which corresponds to the sixth command CMD<6> outputted from the command queue 620, from the partial mapping information SERVICE_MAP stored in the internal cache memory 600 has the value of '0x310'. At this time, 5 pieces of mapping information having the values of '0x200', '0x310', '0x400', '0x460' and '0x461' are stored in the internal cache memory 600. Therefore, the internal cache memory 600 may not have enough memory space to store additional piece of mapping information. However, the value of '0x310' that should be detected for the value of '0x31000' of the sixth logical address LA<6>, which corresponds to the sixth command CMD<6> outputted from the command queue 620, from the partial mapping information SERVICE_MAP stored in the internal cache memory 600 is already stored in the internal cache memory 600. Therefore, the controller 130 may not control the nonvolatile memory device 150 to load from the plurality of memory blocks BLOCK<1:3, . . . > the value of '0x310' that should be detected for the value of '0x31000' of the sixth logical address LA<6> from the partial mapping information SERVICE_MAP stored in the internal cache memory 600, But, the controller 130 may refer to the value of '0x310' for the value of '0x31000' of the sixth logical address LA<6> corresponding to the sixth command CMD<6> from the partial mapping information SERVICE_MAP stored in the internal cache memory 600. The controller 130 may control the nonvolatile memory device 150 to perform an operation in response to the sixth command CMD<6>. The controller 130 may update the piece of mapping information having the value of '0x310' as the most recently used mapping information. Therefore, the victim mapping information having the value of '0x200' and selected at the time point t-3 may not be removed and remain in the internal cache memory 600.

At the time point t-1, the piece of mapping information that should be detected for the value of '0x46200' of the seventh logical address LA<7>, which corresponds to the seventh command CMD<7> outputted from the command queue 620, from the partial mapping information SERVICE_MAP stored in the internal cache memory 600 has the value of '0x462'. At this time, 5 pieces of mapping information having the values of '0x200,' '0x400,' '0x460,' '0x461,' '0x310' are stored in the internal cache memory 600. Therefore, the internal cache memory 600 may not have enough memory space to store additional piece of mapping information. Further, the value of '0x462' that should be detected for the value of '0x46200' of the seventh logical address LA<7>, which corresponds to the seventh command CMD<7> outputted from the command queue 620, from the partial mapping information SERVICE_MAP stored in the internal cache memory 600 is not stored in the internal cache memory 600. Therefore, the controller 130 may remove (A) the victim mapping information, which is the piece of mapping information having the value of '0x200' selected at the time point t-3, among the partial mapping information SERVICE_MAP stored in the internal cache memory 600. Then, the controller 130 may control the nonvolatile memory device 150 to load (B) the piece of mapping information having the value of '0x462' as the piece of mapping information that should be detected for the value of '0x46200' of the seventh logical address LA<7>, which corresponds to the seventh command CMD<7> outputted from the command queue 620, from the partial mapping information SERVICE_MAP stored in the internal cache memory 600 from the plurality of memory blocks BLOCK<1:3, . . . > onto the internal cache memory 600.

As described above, since the victim mapping information is removed at the time point t-1, additional piece of victim mapping information may be selected and removed according to the LRU algorithm to store additional piece of mapping information into the internal cache memory 600 after the time point t-1. Therefore, the controller 130 may select the least recently used mapping information, that is the piece of mapping information having the value of '0x400', as the victim mapping information among the 5 pieces of mapping information having the values of '0x400', '0x460', '0x461', '0x310' and '0x462' currently stored in the internal cache memory 600 according to the LRU algorithm at the time point t-1. At the time point t-1, the controller 130 may not remove in advance the selected victim mapping information, that is the piece of mapping information having the value of '0x400', because there is a chance that the selected victim mapping information (i.e., the piece of mapping information having the value of '0x400') is used before removal thereof after the time point t-1.

At the time point 't', the piece of mapping information that should be detected for the value of '0x20000' of the eighth logical address LA<8>, which corresponds to the eighth command CMD<8> outputted from the command queue 620, from the partial mapping information SERVICE_MAP stored in the internal cache memory 600 has the value of '0x200'. At this time, 5 pieces of mapping information having the values of '0x400', '0x460', '0x461', '0x310' and '0x462' are stored in the internal cache memory 600. Therefore, the internal cache memory 600 may not have enough memory space to store additional piece of mapping information. Further, the value of '0x200' that should be detected for the value of '0x20000' of the eighth logical address LA<8>, which corresponds to the eighth command CMD<8> outputted from the command queue 620, from the partial mapping information SERVICE_MAP stored in the internal cache memory 600 is not stored in the internal cache memory 600. Therefore, the controller 130 may remove (C) the victim mapping information, which is the piece of mapping information having the value of '0x400' selected at the time point 't-1', among the partial mapping information SERVICE_MAP stored in the internal cache memory 600. Then, the controller 130 may control the nonvolatile memory device 150 to load (D) the piece of mapping information having the value of '0x200' as the piece of mapping information that should be detected for the value of '0x20000' of the eighth logical address LA<8>, which corresponds to the eighth command CMD<8> outputted from the command queue 620, from the partial mapping information SERVICE_MAP stored in the internal cache memory 600 from the plurality of memory blocks BLOCK<1:3, . . . > onto the internal cache memory 600.

In summary, when controlling update of the partial mapping information SERVICE_MAP stored in the internal cache memory 600 according to the LRU algorithm as described with reference to FIG. 7, the controller 130 may remove the piece of mapping information having the value of '0x200' from the internal cache memory 600 at the time point t-1. Then, the controller 130 may control the nonvolatile memory device 150 to load again the piece of mapping information having the value of '0x200' from the plurality of memory blocks BLOCK<1:3, . . . > onto the internal cache memory 600 at the time point 't'. That is, when controlling update of the partial mapping information SERVICE_MAP stored in the internal cache memory 600 according only to the LRU algorithm, it is likely to avoid or reduce a situation that a piece of mapping information which is deemed unnecessary may be repeatedly removed from the internal cache memory 600, and then another piece of mapping information may be loaded from the plurality of memory blocks BLOCK<1:3, . . . > onto the internal cache memory 600.

In accordance with an embodiment of the disclosure, the controller 130 may appropriately select a piece of victim mapping information among the partial mapping information SERVICE_MAP or appropriately process a selected victim mapping information by referring to the logical addresses LA<1:8> corresponding to the predetermined number of commands CMD<1:8> stored in the command queue 620.

FIG. 8A illustrates an operation of the controller 130 of selecting a piece of victim mapping information among the partial mapping information SERVICE_MAP stored in the command queue 620 by referring to the logical addresses LA<1:8> corresponding to the predetermined number of commands CMD<1:8> stored in the command queue 620 in accordance with an embodiment of the disclosure.

When selecting a piece of victim mapping information among the partial mapping information SERVICE_MAP stored in the internal cache memory 600, the controller 130 may sequentially select a piece of selected mapping information from the partial mapping information SERVICE_MAP stored in the internal cache memory 600. The controller 130 may determine whether the logical address of the piece of selected mapping information corresponds to any one among the logical addresses LA<1:8> corresponding to the predetermined number of commands CMD<1:8> stored in the command queue 620. The controller 130 may select the piece of selected mapping information as a piece of victim mapping information according to the determination according to the result of the determination of whether the logical address of the piece of selected mapping information corresponds to any one among the logical addresses LA<1:8> corresponding to the predetermined number of commands CMD<1:8> stored in the command queue 620. That is, in accordance with an embodiment of the disclosure, the controller 130 may not directly select the victim mapping information from the partial mapping information SERVICE_MAP stored in the internal cache memory 600 according to the LRU algorithm. Instead, the controller 130 may select the piece of selected mapping information from the partial mapping information SERVICE_MAP stored in the internal cache memory 600 according to the LRU algorithm. The controller 130 may select the piece of selected mapping information as a piece of victim mapping information according to the determination of whether the logical address of the piece of selected mapping information corresponds to any one among the logical addresses LA<1:8> corresponding to the predetermined number of commands CMD<1:8> stored in the command queue 620.

When the controller 130 determines the logical address of the piece of selected mapping information to correspond to any one among the logical addresses LA<1:8> corresponding to the predetermined number of commands CMD<1:8> stored in the command queue 620, the controller 130 may not select the piece of selected mapping information as a piece of victim mapping information. When the controller 130 does not select a current piece of selected mapping information as a piece of victim mapping information, the controller 130 may select another piece of selected mapping information from the partial mapping information SERVICE_MAP except for the previous selected mapping information according to the LRU algorithm.

When the controller 130 determines the logical address of the piece of selected mapping information not to correspond to any one among the logical addresses LA<1:8> corresponding to the predetermined number of commands CMD<1:8> stored in the command queue 620, the controller 130 may select the piece of selected mapping information as a piece of victim mapping information.

In order to determine whether the logical address of the piece of selected mapping information corresponds to any one among the logical addresses LA<1:8> corresponding to the predetermined number of commands CMD<1:8> stored in the command queue 620, the controller 130 may generate a logical address list, in which the logical addresses LA<1:8> of the predetermined number of commands CMD<1:8> are arranged in order of their values. The controller 130 may determine whether the logical address of the piece of selected mapping information corresponds to any one among the logical addresses LA<1:8> corresponding to the predetermined number of commands CMD<1:8> stored in the command queue 620 through the binary search scheme or the linear search scheme. The controller 130 may generate a logical address list of the logical addresses LA<1:8> corresponding to the commands CMD<1:8> remaining in the command queue 620 at the time when the controller 130 selects a piece of selected mapping information from the partial mapping information SERVICE_MAP stored in the internal cache memory 600. For example, since the controller 130 first select a piece of selected mapping information from the partial mapping information SERVICE_MAP stored in the internal cache memory 600 after the time point 't-3' as illustrated in FIG. 8A, the controller 130 may generate a logical address list of the logical addresses LA<6:8> corresponding to the commands CMD<6:8> remaining in the command queue 620 after the time point 't-3'. Therefore, FIG. 8A exemplarily shows the logical address list having the values of '0x200', '0x310' and '0x462' arranged in order of the values. In similar way, since the controller 130 secondly select a piece of selected mapping information from the partial mapping information SERVICE_MAP stored in the internal cache memory 600 after the time point 't-1' as illustrated in FIG. 8A, the controller 130 may generate the logical address list of the logical address LA<8> corresponding to the commands CMD<8> remaining in the command queue 620 after the time point 't-1'. Therefore, FIG. 8A exemplarily shows the logical address list having the value of '0x200'.

The generation of the logical address list may not limit an embodiment of the disclosure. According to an embodiment, it is possible to compare the logical address of the piece of selected mapping information sequentially with the logical addresses LA<1:8> of the predetermined number of commands CMD<1:8> stored in the command queue 620.

In detail, FIG. 8A illustrates the predetermined number of commands CMD<1:8> stored in the command queue 620, the logical addresses LA<1:8> corresponding to the predetermined number of commands CMD<1:8> and mapping information that should be detected for the logical addresses LA<1:8> from the partial mapping information SERVICE_MAP stored in the internal cache memory 600 and that are arranged with time points t-7, t-6, t-5, t-4, t-3, t-2, t-1, t according to the output sequence from the command queue 620, which is the same as illustrated in FIG. 7. Hereinafter, the embodiment described with reference to FIG. 7 will be described with reference to FIG. 8A.

It is exemplified that the number of partial mapping information SERVICE_MAP stored in the internal cache memory 600 is five (5), which is merely an example. The internal cache memory 600 may store more or less partial mapping information SERVICE_MAP than the five (5) numbers of partial mapping information SERVICE_MAP.

In detail, at the time point 't-3' in the example described with reference to FIG. 7, the 5 pieces of mapping information having the values of '0x200', '0x310', '0x400', '0x460' and '0x461' are currently stored in the internal cache memory 600. Therefore, the controller 130 should select a piece of victim mapping information among the 5 pieces of mapping information having the values of '0x200', '0x310', '0x400', '0x460' and '0x461' currently stored in the internal cache memory 600 according to the LRU algorithm to store additional piece of mapping information in the internal cache memory 600 after the time point 't-3'. In accordance with an embodiment of the disclosure, the controller 130 may select the least recently used mapping information, that is the piece of mapping information having the value of '0x200', as the piece of selected mapping information among the 5 pieces of mapping information having the values of '0x200', '0x310', '0x400', '0x460' and '0x461' currently stored in the internal cache memory 600 according to the LRU algorithm at the time point 't-3'. Then, the controller 130 may determine whether the piece of selected mapping information having the value of '0x200' corresponds to the logical addresses LA<1:8> of the predetermined number of commands CMD<1:8> stored in the command queue 620.

When referring to the logical address list, the controller 130 may determine the piece of selected mapping information having the value of '0x200' to correspond to the logical addresses LA<1:8> of the predetermined number of commands CMD<1:8> stored in the command queue 620. Therefore, the controller 130 may not select the piece of selected mapping information having the value of '0x200' as the victim mapping information.

Therefore, the controller 130 may select as another piece of selected mapping information the least recently used mapping information from the partial mapping information SERVICE_MAP except for the previous selected mapping information having the value of '0x200' according to the LRU algorithm at the time point 't-3'. In this case, a piece of mapping information having the value of '0x310' may be selected as another piece of selected mapping information. The controller 130 may determine whether the piece of selected mapping information having the value of '0x310' corresponds to the logical addresses LA<1:8> of the predetermined number of commands CMD<1:8> stored in the command queue 620.

When referring to the logical address list, the controller 130 may determine the piece of selected mapping information having the value of '0x310' to correspond to the logical addresses LA<1:8> of the predetermined number of commands CMD<1:8> stored in the command queue 620. Therefore, the controller 130 may not select the piece of selected mapping information having the value of '0x310' as the victim mapping information.

Therefore, the controller 130 may select as another piece of selected mapping information the least recently used mapping information from the partial mapping information SERVICE_MAP except for the previous selected mapping information having the values of '0x200' and '0x310' according to the LRU algorithm at the time point 't-3'. In this case, a piece of mapping information having the value of '0x400' may be selected as another piece of selected mapping information. The controller 130 may determine whether the piece of selected mapping information having the value of '0x400' corresponds to the logical addresses LA<1:8> of the predetermined number of commands CMD<1:8> stored in the command queue 620.

When referring to the logical address list, the controller 130 may determine the piece of selected mapping information having the value of '0x400' not to correspond to the logical addresses LA<1:8> of the predetermined number of commands CMD<1:8> stored in the command queue 620. Therefore, the controller 130 may select the piece of selected mapping information having the value of '0x400' as the victim mapping information.

Then, at the time point 't-2' in the example described with reference to FIG. 7, the piece of mapping information that should be detected for the value of '0x31000' of the sixth logical address LA<6>, which corresponds to the sixth command CMD<6> outputted from the command queue 620, from the partial mapping information SERVICE_MAP stored in the internal cache memory 600 has the value of '0x310'. At this time, the 5 pieces of mapping information having the values of '0x200', '0x310', '0x400', '0x460' and '0x461' are currently stored in the internal cache memory 600. Therefore, the internal cache memory 600 may not have enough memory space to store additional piece of mapping information. However, the value of '0x310' that should be detected for the value of '0x31000' of the sixth logical address LA<6>, which corresponds to the sixth command CMD<6> outputted from the command queue 620, from the partial mapping information SERVICE_MAP stored in the internal cache memory 600 is already stored in the internal cache memory 600. Therefore, the controller 130 may not control the nonvolatile memory device 150 to load from the plurality of memory blocks BLOCK<1:3, . . . > the value of '0x310' that should be detected for the value of '0x31000' of the sixth logical address LA<6> from the partial mapping information SERVICE_MAP stored in the internal cache memory 600. But, the controller 130 may refer to the value of '0x310' for the value of '0x31000' of the sixth logical address LA<6> corresponding to the sixth command CMD<6> from the partial mapping information SERVICE_MAP stored in the internal cache memory 600. The controller 130 may control the nonvolatile memory device 150 to perform an operation in response to the sixth command CMD<6>. The controller 130 may update the piece of mapping information having the value of '0x310' as the most recently used mapping information. Therefore, the piece of selected mapping information having the value of '0x200' at the time point 't-3' may not be removed and remain in the internal cache memory 600.

At the time point 't-1' in the example described with reference to FIG. 7, the piece of mapping information that should be detected for the value of '0x46200' of the seventh logical address LA<7>, which corresponds to the seventh command CMD<7> outputted from the command queue 620, from the partial mapping information SERVICE_MAP stored in the internal cache memory 600 has the value of '0x462'. At this time, 5 pieces of mapping information having the values of '0x200', '0x400', '0x460', '0x461' and '0x310' are stored in the internal cache memory 600. Therefore, the internal cache memory 600 may not have enough memory space to store additional piece of mapping information. Further, the value of '0x462' that should be detected for the value of '0x46200' of the seventh logical address LA<7>, which corresponds to the seventh command CMD<7> outputted from the command queue 620, from the partial mapping information SERVICE_MAP stored in the internal cache memory 600 is not stored in the internal cache memory 600. Therefore, the controller 130 may remove (E) the victim mapping information, which is the piece of mapping information having the value of '0x200' selected at the time point 't-3', among the partial mapping information SERVICE_MAP stored in the internal cache memory 600. Then, the controller 130 may control the nonvolatile memory device 150 to load (F) the piece of mapping information having the value of '0x462' as the piece of mapping information that should be detected for the value of '0x46200' of the seventh logical address LA<7>, which corresponds to the seventh command CMD<7> outputted from the command queue 620, from the partial mapping information SERVICE_MAP stored in the internal cache memory 600 from the plurality of memory blocks BLOCK<1:3, . . . > onto the internal cache memory 600.

As described above, since the victim mapping information is removed at the time point 't-1', additional piece of victim mapping information may be selected and removed according to the LRU algorithm to store additional piece of mapping information into the internal cache memory 600 after the time point 't-1'. Therefore, the controller 130 may select the least recently used mapping information, that is the piece of mapping information having the value of '0x200', as the piece of selected mapping information among the 5 pieces of mapping information having the values of '0x200', '0x400', '0x460', '0x461' and '0x310' currently stored in the internal cache memory 600 according to the LRU algorithm at the time point 't-1'. The controller 130 may determine whether the logical address of the piece of selected mapping information having the value of '0x400' corresponds to any one among the logical addresses LA<1: 8>. Here, the logical addresses LA<1:8> may correspond to the predetermined number of commands CMD<1:8> stored in the command queue 620 respectively.

When referring to the logical address list, the controller 130 may determine the piece of selected mapping information having the value of '0x200' to correspond to the logical addresses LA<1:8> of the predetermined number of commands CMD<1:8> stored in the command queue 620. Therefore, the controller 130 may not select the piece of selected mapping information having the value of '0x200' as the victim mapping information.

Therefore, the controller 130 may select, as another piece of selected mapping information, the least recently used mapping information from the partial mapping information SERVICE_MAP except for the previous selected mapping information having the value of '0x200' according to the LRU algorithm at the time point 't-1'. In this case, a piece of mapping information having the value of '0x400' may be selected as another piece of selected mapping information. The controller 130 may determine whether the piece of selected mapping information having the value of '0x400' corresponds to the logical addresses LA<1:8> of the predetermined number of commands CMD<1:8> stored in the command queue 620.

When referring to the logical address list, the controller 130 may determine the piece of selected mapping information having the value of '0x400' not to correspond to the logical addresses LA<1:8> of the predetermined number of commands CMD<1:8> stored in the command queue 620. Therefore, the controller 130 may select the piece of selected mapping information having the value of '0x400' as the victim mapping information.

At the time point 't' in the example described with reference to FIG. 7, the piece of mapping information that should be detected for the value of '0x20000' of the eighth logical address LA<8>, which corresponds to the eighth command CMD<8> outputted from the command queue 620, from the partial mapping information SERVICE_MAP stored in the internal cache memory 600 has the value of '0x200'. At this time, 5 pieces of mapping information having the values of '0x200', '0x460', '0x461', '0x310' and '0x462' are stored in the internal cache memory 600. Therefore, the internal cache memory 600 may not have sufficient memory space to store additional piece of mapping information.

Further, the value of '0x200' that should be detected for the value of '0x20000' of the eighth logical address LA<8>, which corresponds to the eighth command CMD<8> outputted from the command queue 620, from the partial mapping information SERVICE_MAP stored in the internal cache memory 600 is not stored in the internal cache memory 600. Therefore, the controller 130 may remove (C) the victim mapping information, which is the piece of mapping information having the value of '0x400' selected at the time point 't-1', among the partial mapping information SERVICE_MAP stored in the internal cache memory 600, and then may control the nonvolatile memory device 150 to load (D) the piece of mapping information having the value of '0x200' as the piece of mapping information that should be detected for the value of '0x20000' of the eighth logical address LA<8>, which corresponds to the eighth command CMD<8> outputted from the command queue 620, from the partial mapping information SERVICE_MAP stored in the internal cache memory 600 from the plurality of memory blocks BLOCK<1:3, . . . > onto the internal cache memory 600. However, the value of '0x200' that should be detected for the value of '0x20000' of the eighth logical address LA<8>, which corresponds to the eighth command CMD<8> outputted from the command queue 620, from the partial mapping information SERVICE_MAP stored in the internal cache memory 600 is currently stored in the internal cache memory 600. Therefore, the controller 130 may not control the nonvolatile memory device 150 to load from the plurality of memory blocks BLOCK<1:3, . . . > the value of '0x200' that should be detected for the value of '0x20000' of the eighth logical address LA<8> from the partial mapping information SERVICE_MAP stored in the internal cache memory 600. But, the controller 130 may refer to the value of '0x200' for the value of '0x20000' of the eighth logical address LA<8> corresponding to the eighth command CMD<8> from the partial mapping information SERVICE_MAP stored in the internal cache memory 600. The controller 130 may control the nonvolatile memory device 150 to perform an operation in response to the eighth command CMD<8>. The controller 130 may update the piece of mapping information having the value of '0x200' as the most recently used mapping information. Therefore, the victim mapping information having the value of '0x460' and selected at the time point 't-1' may not be removed and remain in the internal cache memory 600.

In summary, when controlling selection of the victim mapping information among the partial mapping information SERVICE_MAP stored in the internal cache memory 600 by referring to the logical addresses LA<1:8> of the predetermined number of commands CMD<1:8> stored in the command queue 620, it is likely to avoid or reduce a situation that a piece of mapping information which is deemed unnecessary may be repeatedly removed from the internal cache memory 600, and then another piece of mapping information may be loaded from the plurality of memory blocks BLOCK<1:3, . . . > onto the internal cache memory 600 when compared with the controlling of update of the partial mapping information SERVICE_MAP stored in the internal cache memory 600 according to the LRU algorithm as described with reference to FIG. 7.

That is, as described above with reference to FIG. 7, the controller 130 may remove the piece of mapping information having the value of '0x200' from the internal cache memory 600 at the time point 't-1' and then may control the nonvolatile memory device 150 to load again the piece of mapping information having the value of '0x200' from the plurality of memory blocks BLOCK<1:3, . . . > onto the internal cache memory 600 at the time point 't'. However, as described with reference to FIG. 8A, the piece of mapping information having the value of '0x200' may be predicted to be used at the time point 't' and the piece of mapping information having the value of '0x400' is removed at the time point 't-1'. Therefore, the piece of mapping information having the value of '0x200' may be used in the internal cache memory 600 at the time point 't'. As such, as described with reference to FIG. 8A, it is likely to avoid or reduce a situation that a piece of mapping information which is deemed unnecessary may be repeatedly removed from the internal cache memory 600 and then another piece of mapping information may be loaded from the plurality of memory blocks BLOCK<1:3, . . . > onto the internal cache memory 600 when compared with the controlling of update of the partial mapping information SERVICE_MAP stored in the internal cache memory 600 according to the LRU algorithm as described with reference to FIG. 7.

Figure 8B:
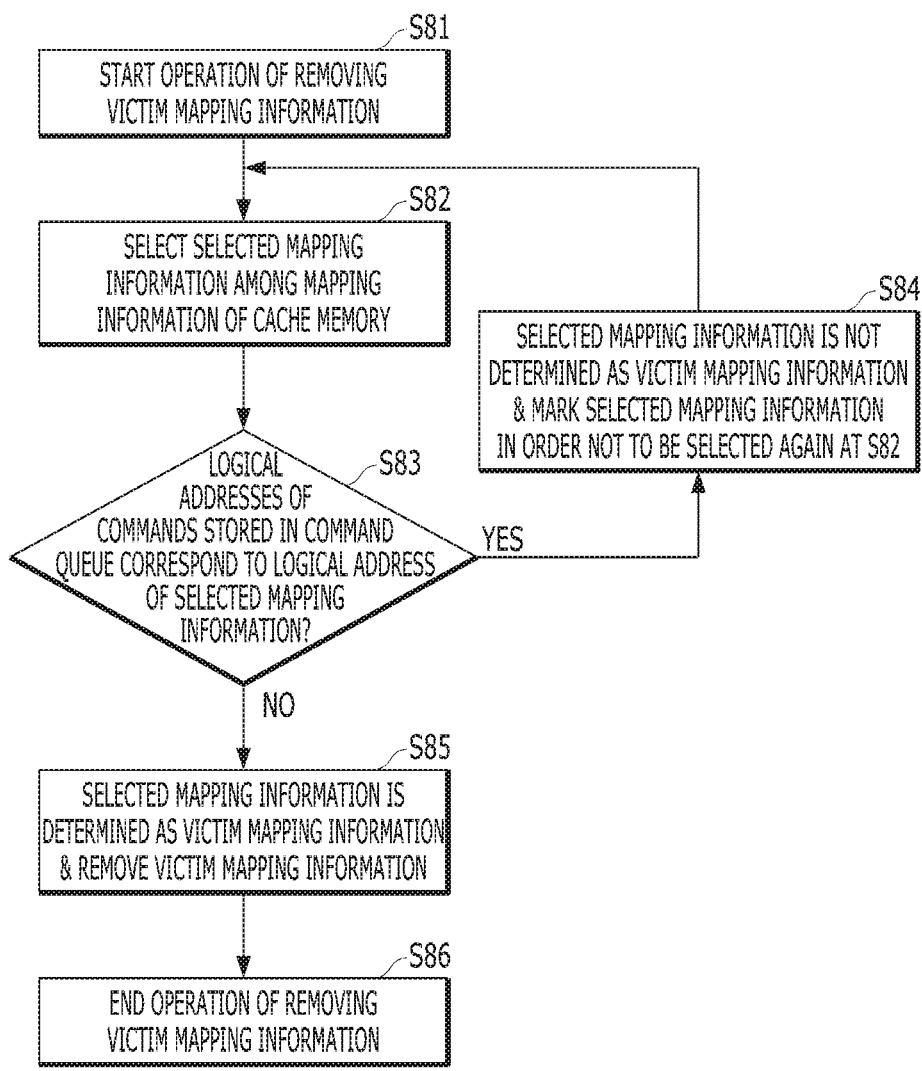

FIG. 8B illustrates an operation of selecting a piece of victim mapping information among the partial mapping information SERVICE_MAP stored in the internal cache memory 600 by the controller 130 in accordance with an embodiment of the invention.

Referring to FIG. 8B, at step S81, the controller 130 may start an operation of removing a piece of victim mapping information when required to select and remove a piece of victim mapping information among the partial pieces of mapping information Service_Map stored in the internal cache memory 600.

At step S82, the controller 130 may sequentially select a piece of selected mapping information from the partial mapping information SERVICE_MAP stored in the internal cache memory 600 according to the Least Recently Used (LRU) algorithm.

At step S83, the controller 130 may determine whether the logical address of the piece of selected mapping information corresponds to any one among the logical addresses LA<1:8> corresponding to the predetermined number of commands CMD<1:8> stored in the command queue 620.

When the logical address of the piece of selected mapping information is determined to correspond to any one among the logical addresses LA<1:8> corresponding to the predetermined number of commands CMD<1:8> stored in the command queue 620 ("YES" at step S83), the controller 130 may not select the piece of selected mapping information as a piece of victim mapping information and may mark the current piece of selected mapping information at step S84 in order for the current piece of selected mapping information not to be selected as a piece of selected mapping information again at subsequent step S82.

When the logical address of the piece of selected mapping information is determined not to correspond to any one among the logical addresses LA<1:8> corresponding to the predetermined number of commands CMD<1:8> stored in the command queue 620 ("NO" at step S83), the controller 130 may select the piece of selected mapping information as a piece of victim mapping information and remove the piece of victim mapping information at step S85.

The piece of victim mapping information selected at step S85 may be immediately removed. Or, the piece of victim mapping information may be removed after a predetermined time. The operation of removing a piece of victim mapping information may be completed at step S86 when the removal of the piece of victim mapping information is completed.

FIG. 9A illustrates an operation of the controller 130 of processing a piece of victim mapping information among the partial mapping information SERVICE_MAP stored in the command queue 620 by referring to the logical addresses LA<1:8> corresponding to the predetermined number of commands CMD<1:8> stored in the command queue 620 in accordance with an embodiment of the disclosure.

When selecting a piece of victim mapping information among the partial mapping information SERVICE_MAP stored in the internal cache memory 600, the controller 130 may sequentially select a piece of victim mapping information from the partial mapping information SERVICE_MAP stored in the internal cache memory 600. The controller 130 may determine whether the logical address of the selected piece of victim mapping information corresponds to any one among the logical addresses LA<1:8> corresponding to the predetermined number of commands CMD<1:8> stored in the command queue 620. The controller 130 may assign a physical address of the selected piece of victim mapping information to the predetermined number of commands CMD<1:8> stored in the command queue 620 according to the result of the determination of whether the logical address of the piece of victim mapping information corresponds to any one among the logical addresses LA<1:8> corresponding to the predetermined number of commands CMD<1:8> stored in the command queue 620. That is, in accordance with an embodiment of the disclosure, the controller 130 may directly select the victim mapping information from the partial mapping information SERVICE_MAP stored in the internal cache memory 600 according to the LRU algorithm. However, differently from the embodiment described with reference to FIG. 7, the controller 130 may assign in advance a physical address of the piece of victim mapping information to a corresponding one among the predetermined number of commands CMD<1:8> stored in the command queue 620 according to the result of the determination of whether the logical address of the piece of victim mapping information corresponds to any one among the logical addresses LA<1:8> corresponding to the predetermined number of commands CMD<1:8> stored in the command queue 620.

When the logical address of the piece of victim mapping information is determined to correspond to any one among the logical addresses LA<1:8> corresponding to the predetermined number of commands CMD<1:8> stored in the command queue 620, the controller 130 may assign in advance a physical address of the piece of victim mapping information to the command having the logical address corresponding to the logical address of the piece of victim mapping information.

When the logical address of the piece of victim mapping information is determined not to correspond to any one among the logical addresses LA<1:8> corresponding to the predetermined number of commands CMD<1:8> stored in the command queue 620, the controller 130 may not perform any operation.

In order to determine whether the logical address of the piece of victim mapping information corresponds to any one among the logical addresses LA<1:8> corresponding to the predetermined number of commands CMD<1:8> stored in the command queue 620, the controller 130 may generate a logical address list, in which the logical addresses LA<1:8> of the predetermined number of commands CMD<1:8> are arranged in order of their values. The controller 130 may determine whether the logical address of the piece of victim mapping information corresponds to any one among the logical addresses LA<1:8> corresponding to the predetermined number of commands CMD<1:8> stored in the command queue 620 through the binary search scheme or the linear search scheme. The controller 130 may generate a logical address list of the logical addresses LA<1:8> corresponding to the commands CMD<1:8> remaining in the command queue 620 at the time when the controller 130 selects a piece of victim mapping information from the partial mapping information SERVICE_MAP stored in the internal cache memory 600. For example, since the controller 130 first selects a piece of victim mapping information from the partial mapping information SERVICE_MAP stored in the internal cache memory 600 after the time point 't-3' as illustrated in FIG. 9A, the controller 130 may generate a logical address list of the logical addresses LA<6:8> corresponding to the commands CMD<6:8> remaining in the command queue 620 after the time point 't-3'. Therefore, FIG. 9A exemplarily shows the logical address list having the values of '0x200', '0x310' and '0x462' arranged in order of the values. In similar way, since the controller 130 secondly selects a piece of victim mapping information from the partial mapping information SERVICE_MAP stored in the internal cache memory 600 after the time point 't-1' as illustrated in FIG. 9A, the controller 130 may generate the logical address list of the logical address LA<8> corresponding to the commands CMD<8> remaining in the command queue 620 after the time point 't-1'. Therefore, FIG. 9A exemplarily shows the logical address list having the value of '0x200'.

The generation of the logical address list may not limit an embodiment of the disclosure. In an embodiment, it is possible to compare the logical address of the piece of victim mapping information sequentially with the logical addresses LA<1:8> of the predetermined number of commands CMD<1:8> stored in the command queue 620.

In detail, FIG. 9A illustrates the predetermined number of commands CMD<1:8> stored in the command queue 620, the logical addresses LA<1:8> corresponding to the predetermined number of commands CMD<1:8> and mapping information that should be detected for the logical addresses LA<1:8> from the partial mapping information SERVICE_MAP stored in the internal cache memory 600 and that are arranged with time points t-7, t-6, t-5, t-4, t-3, t-2, t-1, t according to the output sequence from the command queue 620, which is the same as illustrated in FIG. 7. Hereinafter, the embodiment described with reference to FIG. 7 will be described with reference to FIG. 9A.

It is exemplified that the number of partial mapping information SERVICE_MAP stored in the internal cache memory 600 is five (5), which is merely an example. The internal cache memory 600 may store more or less partial mapping information SERVICE_MAP than the five (5) numbers of partial mapping information SERVICE_MAP of the example of FIG. 9A.

In detail, at the time point 't-3' in the example described with reference to FIG. 7, the 5 pieces of mapping information having the values of '0x200', '0x310', '0x400', '0x460' and '0x461' are stored in the internal cache memory 600. Therefore, the controller 130 should select a piece of victim mapping information among the 5 pieces of mapping information having the values of '0x200', '0x310', '0x400', '0x460' and '0x461' which are stored in the internal cache memory 600 at the time point 't-3' according to the LRU algorithm so that an additional piece of mapping information can be stored in the internal cache memory 600 after the time point 't-3'. In accordance with an embodiment of the disclosure, the controller 130 may select the least recently used mapping information, that is the piece of mapping information having the value of '0x200', as the piece of victim mapping information among the 5 pieces of mapping information having the values of '0x200', '0x310', '0x400', '0x460' and '0x461' stored in the internal cache memory 600 according to the LRU algorithm at the time point 't-3'. Then, the controller 130 may determine whether the piece of victim mapping information having the value of '0x200' corresponds to any of the logical addresses LA<1:8> of the predetermined number of commands CMD<1:8> which are stored in the command queue 620.

When referring to the logical address list, the controller 130 may recognize that the piece of victim mapping information having the value of '0x200' corresponds to the logical address LA<8> of the eighth command CMD<8> among the logical addresses LA<1:8> of the predetermined number of commands CMD<1:8> stored in the command queue 620. Therefore, the controller 130 may assign (F) a physical address of the piece of victim mapping information having the value of '0x200' to the eighth command CMD<8>. That is, the controller 130 may assign in advance the physical address of the piece of victim mapping information to the eighth command CMD<8>, which is not yet processed at this time point.

Then, at the time point 't-2' in the example described with reference to FIG. 7, the piece of mapping information that should be detected for the value of '0x31000' of the sixth logical address LA<6>, which corresponds to the sixth command CMD<6> outputted from the command queue 620, from the partial mapping information SERVICE_MAP stored in the internal cache memory 600 has the value of '0x310'. At this time, the 5 pieces of mapping information having the values of '0x200', '0x310', '0x400', '0x460' and '0x461' are currently stored in the internal cache memory 600. Therefore, the internal cache memory 600 may not have enough memory space to store additional piece of mapping information. However, the value of '0x310' that should be detected for the value of '0x31000' of the sixth logical address LA<6>, which corresponds to the sixth command CMD<6> outputted from the command queue 620, from the partial mapping information SERVICE_MAP stored in the internal cache memory 600 is already stored in the internal cache memory 600. Therefore, the controller 130 may not control the nonvolatile memory device 150 to load from the plurality of memory blocks BLOCK<1:3, . . . > the value of '0x310' that should be detected for the value of '0x31000' of the sixth logical address LA<6> from the partial mapping information SERVICE_MAP stored in the internal cache memory 600. The controller 130 may refer to the value of '0x310' for the value of '0x31000' of the sixth logical address LA<6> corresponding to the sixth command CMD<6> from the partial mapping information SERVICE_MAP stored in the internal cache memory 600. The controller 130 may control the nonvolatile memory device 150 to perform an operation in response to the sixth command CMD<6> and may update the piece of mapping information having the value of '0x310' as the most recently used mapping information. Therefore, the piece of victim mapping information having the value of '0x200' and selected at the time point 't-3' may not be removed but may remain instead in the internal cache memory 600.

At the time point 't-1' in the example described with reference to FIG. 7, the piece of mapping information that should be detected for the value of '0x46200' of the seventh logical address LA<7>, which corresponds to the seventh command CMD<7> outputted from the command queue 620, from the partial mapping information SERVICE_MAP stored in the internal cache memory 600 has the value of '0x462'. At this time, 5 pieces of mapping information having the values of '0x200', '0x400', '0x460', '0x461' and '0x310' are stored in the internal cache memory 600. Therefore, the internal cache memory 600 may not have enough memory space to store additional piece of mapping information. Further, the value of '0x462' that should be detected for the value of '0x46200' of the seventh logical address LA<7>, which corresponds to the seventh command CMD<7> outputted from the command queue 620, from the partial mapping information SERVICE_MAP stored in the internal cache memory 600 is not stored in the internal cache memory 600. Therefore, the controller 130 may remove (G) the victim mapping information, which is the piece of mapping information having the value of '0x200' selected at the time point 't-3', among the partial mapping information SERVICE_MAP stored in the internal cache memory 600, and then may control the nonvolatile memory device 150 to load (H) the piece of mapping information having the value of '0x462' as the piece of mapping information that should be detected for the value of '0x46200' of the seventh logical address LA<7>, which corresponds to the seventh command CMD<7> outputted from the command queue 620, from the partial mapping information SERVICE_MAP stored in the internal cache memory 600 from the plurality of memory blocks BLOCK<1:3, . . . > onto the internal cache memory 600.

As described above, since the victim mapping information is removed at the time point 't-1', additional piece of victim mapping information may be selected and removed according to the LRU algorithm to store an additional piece of mapping information into the internal cache memory 600 after the time point 't-1'. Therefore, the controller 130 may select the least recently used mapping information, that is the piece of mapping information having the value of '0x400', as the piece of victim mapping information among the 5 pieces of mapping information having the values of '0x400', '0x460', '0x461', '0x310' and '0x462' currently stored in the internal cache memory 600 according to the LRU algorithm at the time point 't-1', and may determine whether the logical address of the piece of victim mapping information having the value of '0x400' corresponds to any one among the logical addresses LA<1:8> corresponding to the predetermined number of commands CMD<1:8> stored in the command queue 620.

When referring to the logical address list, the controller 130 may determine the piece of selected mapping information having the value of '0x400' not to correspond to the logical addresses LA<1:8> of the predetermined number of commands CMD<1:8> stored in the command queue 620. Therefore, the controller 130 may not perform any operation with the piece of selected mapping information having the value of '0x400'.

At the time point 't' in the example described with reference to FIG. 7, the eighth command CMD<8> may be outputted from the command queue 620 and then processed. As described above, the controller 130 may assign in advance the physical address of the piece of victim mapping information having the value of '0x200' to the eighth command CMD<8>, which is not yet processed at the time point 't-3'. Therefore, when processing the eighth command CMD<8>, the controller 130 may not refer to the whole mapping information ALL_MAP stored in the internal cache memory 600 but refer to the physical address assigned to the eighth command CMD<8> thereby controlling the nonvolatile memory device 150 to perform an operation in response to the eighth command CMD<8>.

Therefore, in the internal cache memory 600, the values of the partial mapping information SERVICE_MAP at the time point 't' may be the same as the values of the partial mapping information SERVICE_MAP at the time point (L). That is, 5 pieces of mapping information having the values of '0x400', '0x460', '0x461', '0x310' and '0x462' are stored in the internal cache memory 600 at the time point 't'.

In summary, when controlling the process of the victim mapping information among the partial mapping information SERVICE_MAP stored in the internal cache memory 600 by referring to the logical addresses LA<1:8> of the predetermined number of commands CMD<1:8> stored in the command queue 620, it is likely to avoid or reduce a situation that a piece of mapping information which is deemed unnecessary is repeatedly removed from the internal cache memory 600 and then another piece of mapping information is loaded from the plurality of memory blocks BLOCK<1:3, . . . > onto the internal cache memory 600 when compared with the controlling of update of the partial mapping information SERVICE_MAP stored in the internal cache memory 600 according to the LRU algorithm as described with reference to FIG. 7.

That is, as described above with reference to FIG. 7, the controller 130 may remove the piece of mapping information having the value of '0x200' from the internal cache memory 600 at the time point 't-1'. Then, the controller 130 may control the nonvolatile memory device 150 to load again the piece of mapping information having the value of '0x200' from the plurality of memory blocks BLOCK<1:3, . . . > onto the internal cache memory 600 at the time point 't'. However, as described with reference to FIG. 9A, the piece of mapping information having the value of '0x200' may be predicted to be used for the eighth command CMD<8> at the time point 't'. The physical address of the piece of mapping information having the value of '0x200' may be assigned in advance to the eighth command CMD<8> at the time point 't-3'. Therefore, the controller 130 does not need to refer to the partial mapping information SERVICE_MAP stored in the internal cache memory 600 to process the eighth command CMD<8> at the time point T. As such, as described with reference to FIG. 9A, it is likely to avoid or reduce a situation that a piece of mapping information, which is deemed unnecessary, is repeatedly removed from the internal cache memory 600 and then another piece of mapping information may be loaded from the plurality of memory blocks BLOCK<1:3, . . . > onto the internal cache memory 600 when compared with the controlling of update of the partial mapping information SERVICE_MAP stored in the internal cache memory 600 according to the LRU algorithm as described with reference to FIG. 7.

Figure 9B:
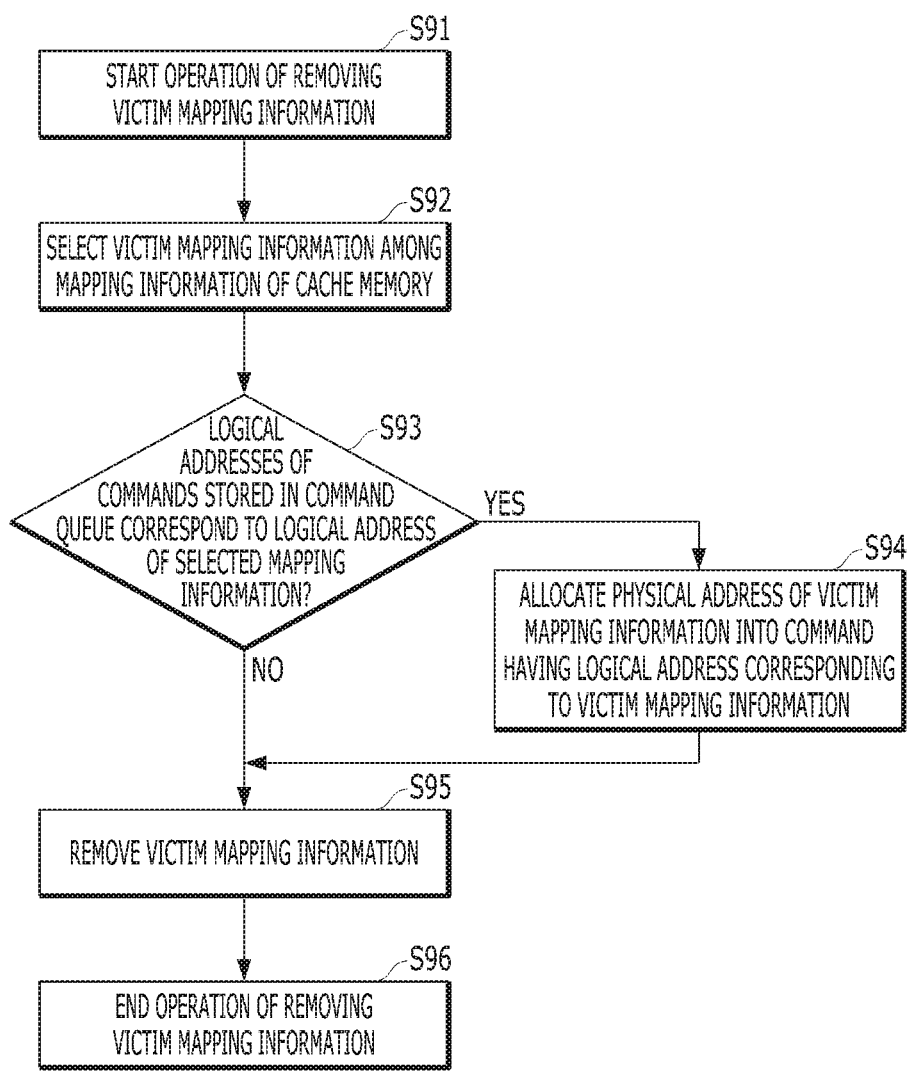
FIG. 9B is a flowchart of a managing mapping information operation in cache memory of the memory system, in accordance with an embodiment of the disclosure.

FIG. 9B illustrates an operation of selecting a piece of victim mapping information among the partial mapping information SERVICE_MAP stored in the internal cache memory 600 by the controller 130, in accordance with an embodiment of the invention.

Referring to FIG. 9B, at step S91, the controller 130 may start an operation of removing a piece of victim mapping information when required to select and remove a piece of victim mapping information among the partial pieces of mapping information SERVICE_MAP stored in the internal cache memory 600.

At step S92, the controller 130 may sequentially select a piece of victim mapping information from the partial mapping information SERVICE_MAP stored in the internal cache memory 600 according to the Least Recently Used (LRU) algorithm.

At step S93, the controller 130 may determine whether the logical address of the selected piece of victim mapping information corresponds to any one among the logical addresses LA<1:8> corresponding to the predetermined number of commands CMD<1:8> stored in the command queue 620.

When the logical address of the selected piece of victim mapping information is determined to correspond to any one among the logical addresses LA<1:8> corresponding to the predetermined number of commands CMD<1:8> stored in the command queue 620 ("YES" at step S93), the controller 130 may assign a physical address of the piece of victim mapping information to the command having a logical address corresponding to the logical address of the piece of victim mapping information at step S94.

When the logical address of the selected piece of victim mapping information is determined that does not correspond to any one among the logical addresses LA<1:8> corresponding to the predetermined number of commands CMD<1:8> stored in the command queue 620 ("NO" at step S93), the controller 130 does not perform any operation with the selected piece of victim mapping information.

The controller 130 may remove the selected piece of victim mapping information, to which the process is completed through steps S93 and S94, immediately at the time of the completion of the process at step S95, or after a predetermined time. The operation of removing a piece of victim mapping information may be completed at step S96 when the removal of the piece of victim mapping information is completed.

In this disclosure, the controller 130 is exemplified to use the LRU algorithm, which is merely an example for convenience of description. According to an embodiment, the controller 130 may use any suitable selection algorithm other than the LRU algorithm according to a system design.

Hereinafter, a data processing system and electronic devices which may be constituted with the memory system 110 including the memory device 150 and the controller 130, which are described above by referring to FIGS. 1 to 9b, will be described in detail with reference to FIGS. 10 to 18.

FIGS. 10 to 18 are diagrams schematically illustrating application examples of the data processing system of FIGS. 1 to 9b according to various embodiments.

Figure 10:
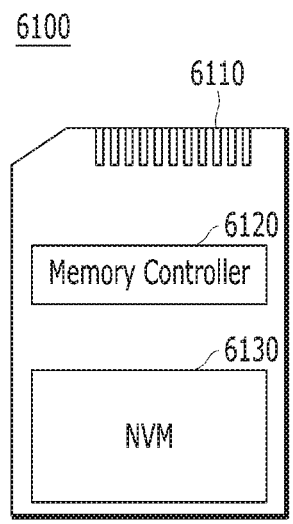
FIGS. 10 to 18 are diagrams schematically illustrating application examples of a data processing system, in accordance with various embodiments of the present invention.

FIG. 10 is a diagram schematically illustrating an example of the data processing system including the memory system, in accordance with an embodiment. FIG.

10 schematically illustrates a memory card system including the memory system, in accordance with an embodiment.

Referring to FIG. 10, the memory card system 6100 may include a memory controller 6120, a memory device 6130 and a connector 6110.

More specifically, the memory controller 6120, configured to access the memory device 6130, may be electrically connected to the memory device 6130. The memory device 6130 may be embodied by a nonvolatile memory. By the way of example but not limitation, the memory controller 6120 may be configured to control read, write, erase and background operations onto the memory device 6130. The memory controller 6120 may be configured to provide an interface between the memory device 6130 and a host and/or to use a firmware for controlling the memory device 6130. That is, the memory controller 6120 may correspond to the controller 130 in the memory system 110 described with reference to FIGS. 1 to 9b, while the memory device 6130 may correspond to the memory device 150 described with reference to FIGS. 1 to 9b.

Thus, the memory controller 6120 may include a RAM, a processing unit, a host interface, a memory interface and an error correction unit. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device under one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system, in accordance with an embodiment may be applied to wired/wireless electronic devices or specific mobile electronic devices.

The memory device 6130 may be implemented by a nonvolatile memory. By the way of example but not limitation, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and a universal flash storage (UFS).

Figure 11:
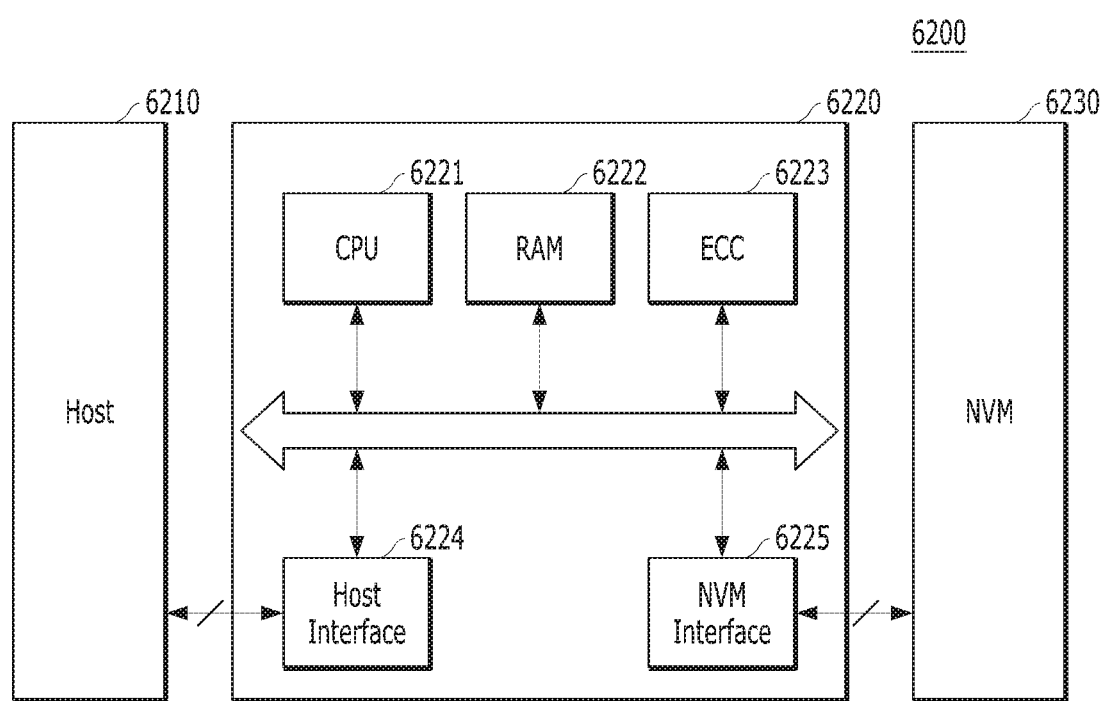

FIG. 11 is a diagram schematically illustrating another example of the data processing system including a memory system, in accordance with an embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 9b. The memory controller 6220 may correspond to the controller 130 in the memory system 110 described in FIGS. 1 to 9b.

The memory controller 6220 may control a read, write, or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. in this case, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit to, or receive from, the host 6210 data or signals through the host interface 6224. The memory controller 6220 may transmit to, or receive from, the memory device 6230 data or signals through the NVM interface 6225. The host interface 6224 may be connected to the host 6210 through a PATA bus, a SATA bus, a SCSI, an USB, a PCIe, or a NAND interface. The memory controller 6220 may have a wireless communication function with a mobile communication protocol such as WiFi or Long Term Evolution (LTE). The memory controller 6220 may be connected to an external device, e.g., the host 6210, or another external device, and then transmit/receive data to/from the external device. As the memory controller 6220 is configured to communicate with the external device through one or more of various communication protocols, the memory system and the data processing system, in accordance with an embodiment may be applied to wired/wireless electronic devices or particularly a mobile electronic device.

Figure 12:
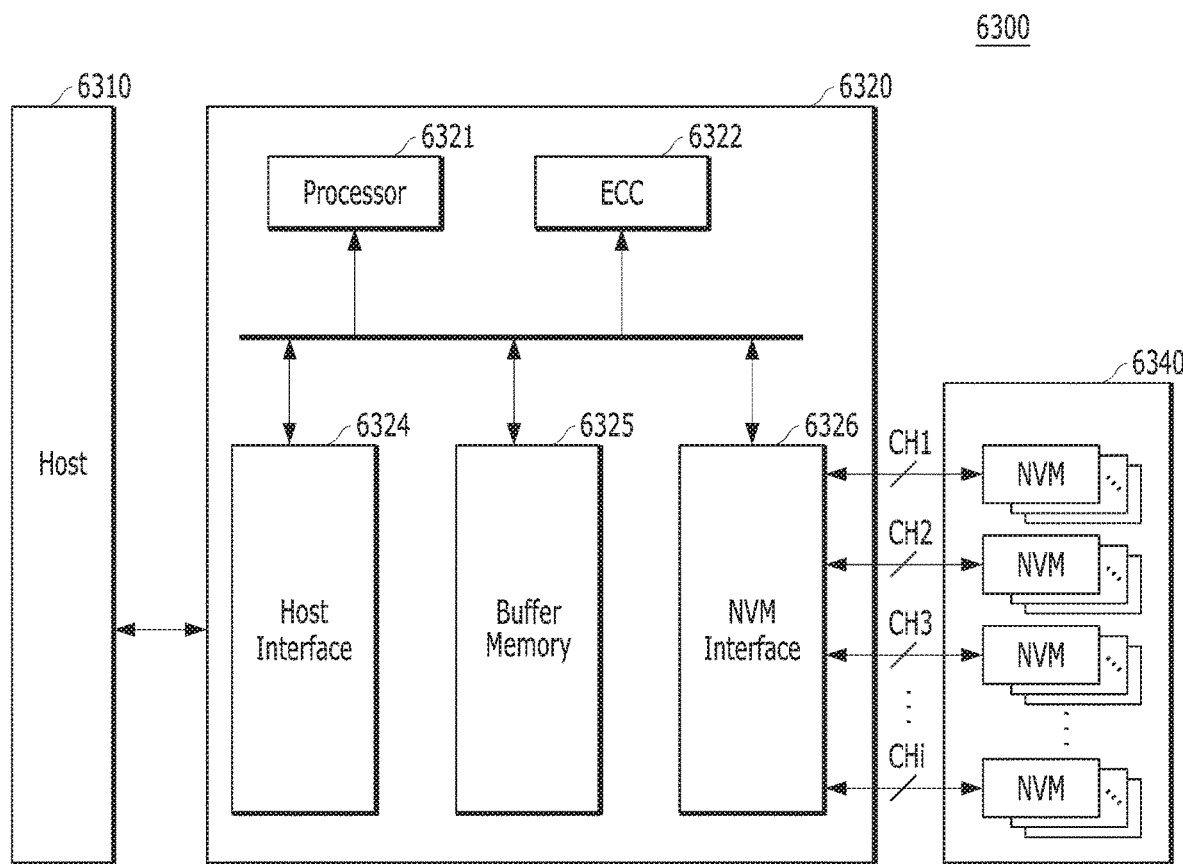

FIG. 12 is a diagram schematically illustrating another example of the data processing system including the memory system, in accordance with an embodiment. FIG. 12 schematically illustrates an SSD to which the memory system, in accordance with an embodiment is applied.

Referring to FIG. 12, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340. Or, the buffer memory 6325 may temporarily store meta data of the plurality of flash memories NVM, for example, map data including a mapping table. The buffer memory 6325 may be embodied by volatile memories such as a DRAM, an SDRAM, a DDR SDRAM, an LPDDR SDRAM and a GRAM or nonvolatile memories such as an FRAM, a ReRAM, a STT-MRAM and a PRAM. For the purpose of description, FIG. 12 illustrates that the buffer memory 6325 exists in the controller 6320, but the buffer memory 6325 may be located or arranged outside the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, e.g., RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, i.e., RAID level information of the write command provided from the host 6310 in the SSDs 6300, and may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, to output data read from the selected SSDs 6300 to the host 6310.

Figure 13:
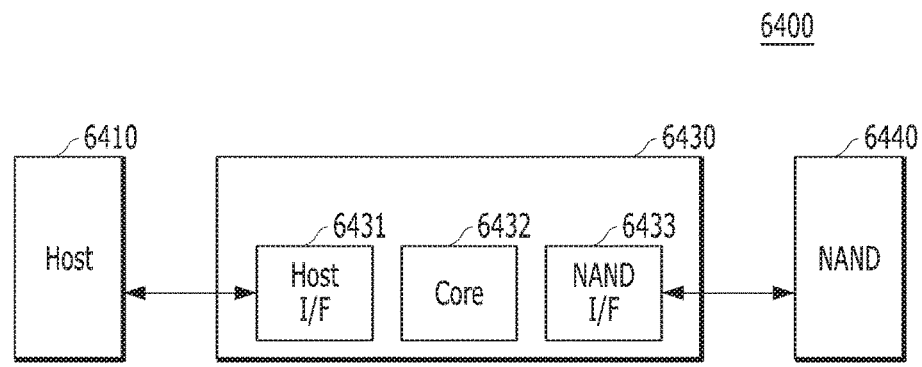

FIG. 13 is a diagram schematically illustrating another example of the data processing system including the memory system, in accordance with an embodiment. FIG. 13 schematically illustrates an embedded Multi-Media Card (eMMC) to which the memory system, in accordance with an embodiment is applied.

Referring to FIG. 13, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system, in accordance with an embodiment. FIGS. 14 to 17 schematically illustrate UFS (Universal Flash Storage) systems to which the memory system, in accordance with an embodiment is applied.

Referring to FIGS. 14 to 17, the UFS systems 6500, 6600, 6700 and 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700 and 6800 may communicate with external devices, e.g., wired/wireless electronic devices or particularly mobile electronic devices through UFS protocols. The UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 10 to 12, and the UFS cards 6530, 6630, 6730, 6830 may be embodied in the form of the memory card system 6100 described with reference to FIG. 10.

Furthermore, in the UFS systems 6500, 6600, 6700 and 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, e.g., UFDs, MMC, SD, mini-SD, and micro-SD.

Figure 14:
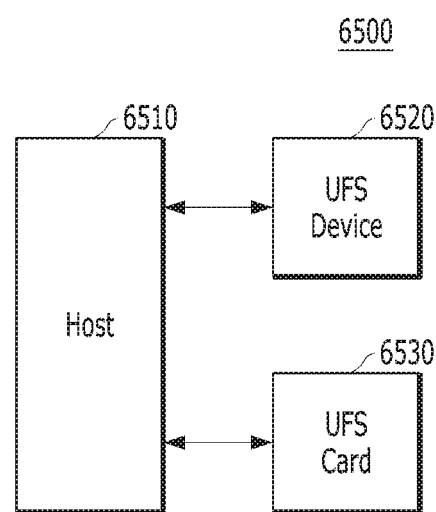

In the UFS system 6500 illustrated in FIG. 14, each of the host 6510, the UFS device 6520 and the UFS card 6530 may include UniPro. The host 6510 may perform a switching operation to communicate with at least one of the UFS device 6520 and the UFS card 6530. The host 6510 may communicate with the UFS device 6520 or the UFS card 6530 through link layer switching, e.g., L3 switching at the UniPro. In this case, the UFS device 6520 and the UFS card 6530 may communicate with each other through a link layer switching at the UniPro of the host 6510. In an example, the configuration in which one UFS device 6520 and one UFS card 6530 are connected to the host 6510 has been exemplified for convenience of description. However, a plurality of UFS devices and UFS cards may be connected in parallel or in the form of a star to the host 6410 (herein, the form of a star means an arrangement that a single device is coupled with plural other devices or cards for centralized control), and a plurality of UFS cards may be connected in parallel or in the form of a star to the UFS device 6520 or connected in series or in the form of a chain to the UFS device 6520.

Figure 15:
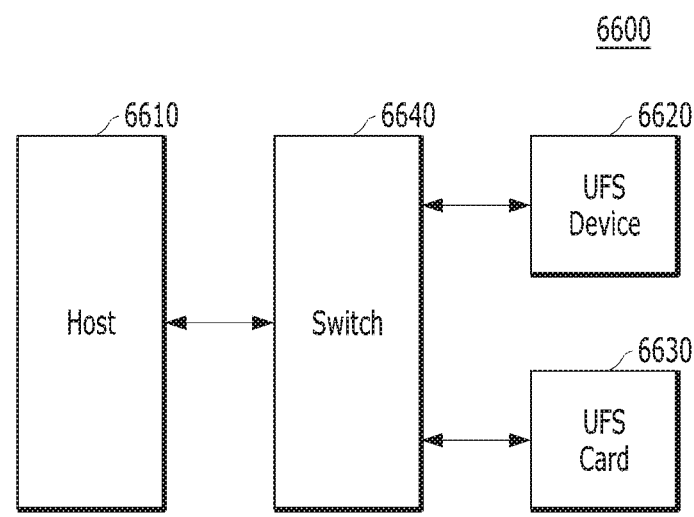

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an example, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640. A plurality of UFS cards may be connected in series or in the form of a chain to the UFS device 6620.

Figure 16:
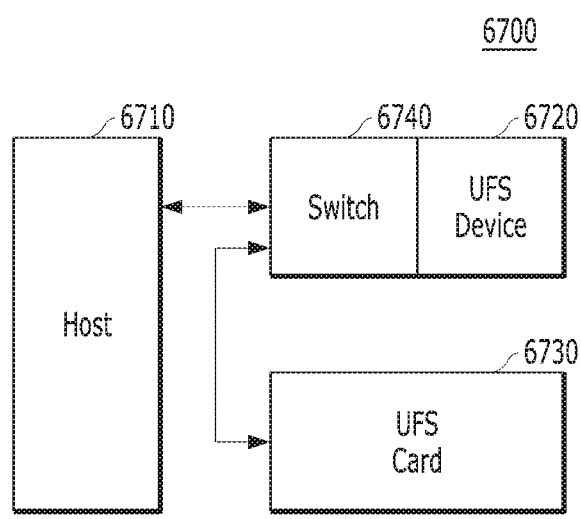

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, the switching module 6740 which performs link layer switching at the UniPro, for example, L3 switching. In this case, the UFS device 6720 and the UFS card 6730 may communicate with each other through link layer switching of the switching module 6740 at the UniPro. The switching module 6740 may be integrated as one module with the UFS device 6720 inside or outside the UFS device 6720. In an example, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
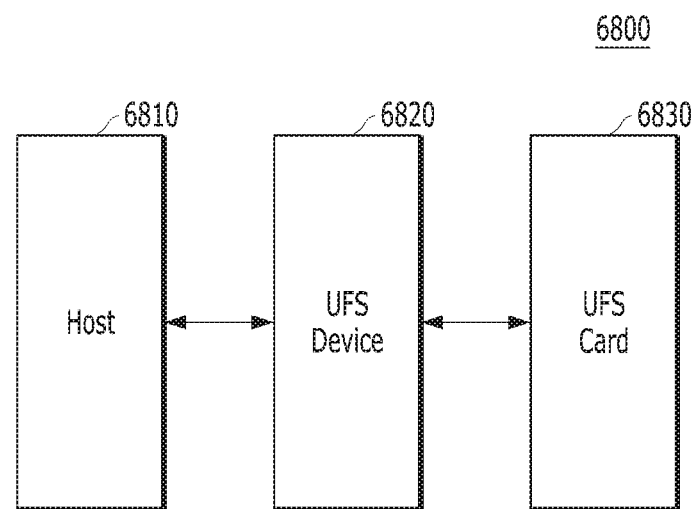

In the UFS system 6800 illustrated in FIG. 17, each of the host 6810, the UFS device 6820 and the UFS card 6830 may include M-PHY and UniPro. The UFS device 6820 may perform a switching operation to communicate with the host 6810 and the UFS card 6830. The UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. Here, the host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star (e.g., a concentrated style where plural devices are coupled with a single main or central device) to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 18:
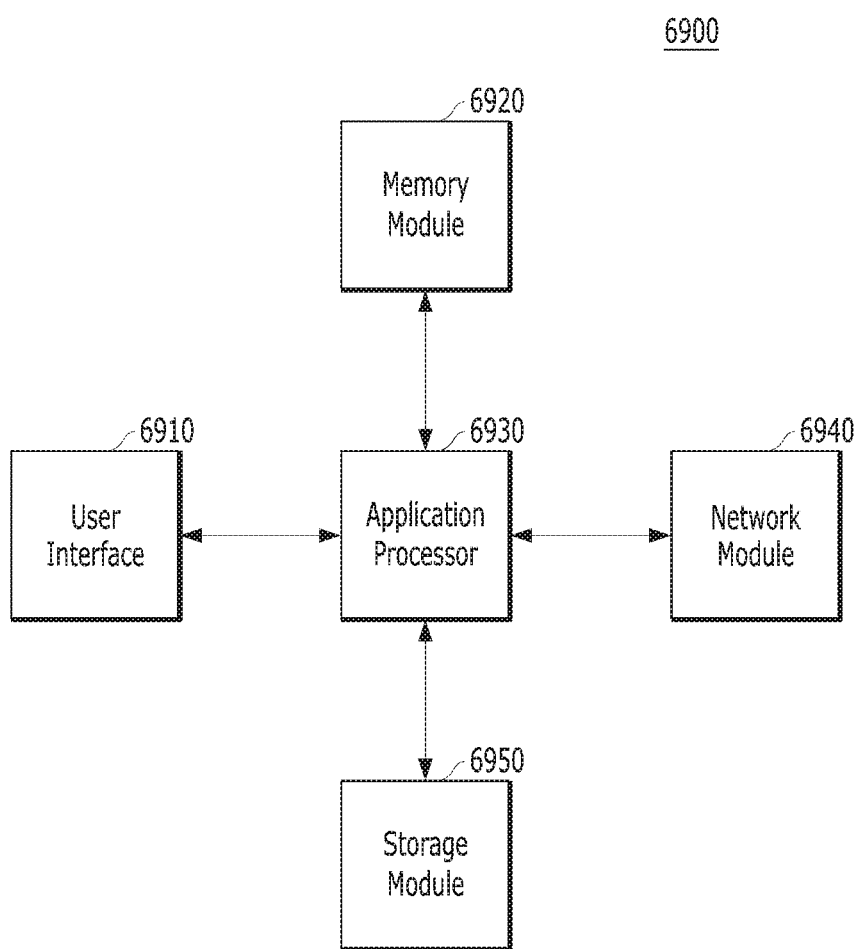

FIG. 18 is a diagram schematically illustrating another example of the data processing system including the memory system, in accordance with an embodiment. FIG. 18 is a diagram schematically illustrating a user system to which the memory system, in accordance with an embodiment is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as a DRAM, a SDRAM, a DDR SDRAM, a DDR2 SDRAM, a DDR3 SDRAM, a LPDDR SDARM, a LPDDR3 SDRAM or a LPDDR3 SDRAM or a nonvolatile RAM such as a PRAM, a ReRAM, a MRAM or a FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as determined in the following claims.

What is claimed is:

1. A memory system comprising:
    a nonvolatile memory device including a plurality of memory blocks; and
    a controller including a command queue adapted to store a plurality of commands from the host,
    wherein the controller is suitable for managing mapping information for mapping logical addresses of the commands to physical addresses of the nonvolatile memory device, storing partial mapping information into an internal cache memory, storing the whole mapping information into the memory blocks, selecting a piece of victim mapping information among the partial mapping information based on predicted usage of the partial mapping information, and removing the piece of victim mapping information,
    wherein the controller selects, when there is a need to determine a piece of victim mapping information among the partial mapping information, the piece of victim mapping information among the partial mapping information stored in the internal cache memory according to a predetermined selection algorithm, determines the predicted usage regarding the piece of victim mapping information according to whether a logical address of the piece of victim mapping information corresponds to any one among the logical addresses of the commands stored in the command queue, and assigns a physical address of the piece of victim mapping information to a command stored in the command queue according to the predicted usage.

2. The memory system of claim 1, wherein the controller sequentially selects, to determine the piece of victim mapping information among the partial mapping information, a piece of partial mapping information as a piece of selected mapping information according to a predetermined selection algorithm, determines the predicted usage regarding the piece of selected mapping information according to whether a logical address of the piece of selected mapping information corresponds to any one among the logical addresses of the commands stored in the command queue, and determines the piece of selected mapping information as the piece of victim mapping information according to the predicted usage.

3. The memory system of claim 2, wherein the controller does not select, when the logical address of the piece of selected mapping information is determined to correspond to any one among the logical addresses of the commands stored in the command queue, the piece of selected mapping information as the piece of victim mapping information.

4. The memory system of claim 2, wherein the controller selects, when the logical address of the piece of selected mapping information is determined not to correspond to any one among the logical addresses of the commands stored in the command queue, the piece of selected mapping information as the piece of victim mapping information.

5. The memory system of claim 2, wherein the controller generates a logical address list, in which values of logical addresses of the commands stored in the command queue are arranged in order, and determines whether the logical address of the piece of selected mapping information corresponds to any one among the values in the logical address list through a binary search scheme or a linear search scheme.

6. The memory system of claim 1, wherein the controller assigns, when the logical address of the piece of victim mapping information is determined to correspond to any one among the logical addresses of the commands stored in the command queue, the physical address of the piece of victim mapping information is assigned to the command having the logical address of the piece of victim mapping information.

7. The memory system of claim 1, wherein the controller generates a logical address list, in which values of logical addresses of the commands stored in the command queue are arranged in order, and determines whether the logical address of the piece of victim mapping information corresponds to any one among the values in the logical address list through a binary search scheme or a linear search scheme.

8. The memory system of claim 1, wherein the controller controls, when the controller searches a logical address of an output command of the command queue in the partial mapping information stored in the internal cache memory in order to use the output command in the nonvolatile memory device but fails to find the logical address of the output command from the partial mapping information stored in the internal cache memory, the nonvolatile memory device to load and store into the internal cache memory a piece of mapping information corresponding to the output command among the whole mapping information stored in the memory blocks, and selects and removes the piece of victim mapping information among the partial mapping information stored in the internal cache memory in order to keep a number of the partial mapping information stored in the internal cache memory equal to or under a predetermined number.

9. The memory system of claim 1, wherein the controller selects and removes, when the controller searches a logical address of an output command of the command queue in the partial mapping information stored in the internal cache memory in order to use the output command in the nonvolatile memory device but fails to find the logical address of the output command from the partial mapping information stored in the internal cache memory, the piece of victim mapping information among the partial mapping information stored in the internal cache memory, and controls the nonvolatile memory device to load and store into the internal cache memory a piece of mapping information corresponding to the output command among the whole mapping information stored in the memory blocks.

10. An operating method of a memory system including a nonvolatile memory device including a plurality of memory blocks and a command queue adapted to store commands requested from a host, the method comprising:
    managing plural pieces of mapping information for mapping logical addresses to physical addresses, and storing partial mapping information into an internal cache memory and the whole mapping information into the memory blocks; and
    selecting a piece of victim mapping information among the partial mapping information based on predicted usage of the partial mapping information to remove the piece of victim mapping information,
    wherein the selecting the piece of victim mapping information includes:
    selecting, when there is a need to select a piece of victim mapping information among the partial mapping information stored in the internal cache memory and to remove the piece of victim mapping information, the piece of victim mapping information among the partial mapping information stored in the internal cache memory according to a predetermined selection algorithm;
    determining the predicted usage regarding the piece of victim mapping information according to whether a logical address of the piece of victim mapping information corresponds to any one among the logical addresses of the commands stored in the command queue; and
    assigning a physical address of the piece of victim mapping information to a command stored in the command queue according to the predicted usage.

11. The method of claim 10, wherein the selecting the piece of victim mapping information includes:
    sequentially selecting, to determine the piece of victim mapping information among the partial mapping information, a piece of partial mapping information as a piece of selected mapping information according to a predetermined selection algorithm;
    determining the predicted usage regarding the piece of selected mapping information according to whether a logical address of the piece of selected mapping information corresponds to any one among the logical addresses of the commands stored in the command queue; and
    determining the piece of selected mapping information as the piece of victim mapping information according to the predicted usage.

12. The method of claim 11, wherein, when the logical address of the piece of selected mapping information is determined to correspond to any one among the logical addresses of the commands stored in the command queue, the piece of selected mapping information as the piece of victim mapping information.

13. The method of claim 11, wherein, when the logical address of the piece of selected mapping information is determined not to correspond to any one among the logical addresses of the commands stored in the command queue, the piece of selected mapping information as the piece of victim mapping information.

14. The method of claim 11, wherein the determining of the predicted usage regarding the piece of selected mapping information includes:
    generating a logical address list, in which values of logical addresses of the commands stored in the command queue are arranged in order; and
    determining whether the logical address of the piece of selected mapping information corresponds to any one among the values in the logical address list through a binary search scheme or a linear search scheme.

15. The method of claim 10, wherein, when the logical address of the piece of victim mapping information is determined to correspond to any one among the logical addresses of the commands stored in the command queue, the physical address of the piece of victim mapping information is assigned to the command having the logical address of the piece of victim mapping information.

16. The method of claim 10, wherein the determining the predicted usage includes:
    generating a logical address list, in which values of logical addresses of the commands stored in the command queue are arranged in order; and
    determining whether the logical address of the piece of victim mapping information corresponds to any one among the values in the logical address list through a binary search scheme or a linear search scheme.

17. The method of claim 10, further comprising:
    controlling, when the controller searches a logical address of an output command of the command queue in the partial mapping information stored in the internal cache memory in order to use the output command in the nonvolatile memory device but fails to find the logical address of the output command from the partial mapping information stored in the internal cache memory, the nonvolatile memory device to load and store into the internal cache memory a piece of mapping information corresponding to the output command among the whole mapping information stored in the memory blocks; and
    removing the piece of victim mapping information selected by the controlling of the operation of the selecting to keep a number of the partial mapping information stored in the internal cache memory equal to or under a predetermined number after the storing of the partial mapping information into the internal cache memory.

18. The method of claim 10, further comprising:
    removing, when the controller searches a logical address of an output command of the command queue in the partial mapping information stored in the internal cache memory in order to use the output command in the nonvolatile memory device but fails to find the logical address of the output command from the partial mapping information stored in the internal cache memory, the piece of victim mapping information selected by the controlling of the operation of the selecting; and
    controlling the nonvolatile memory device to load and store into the internal cache memory a piece of mapping information corresponding to the output command among the whole mapping information stored in the memory blocks after the removing of the piece of victim mapping information.

* * * * *